(12) United States Patent
Ji

(10) Patent No.: US 12,417,045 B2
(45) Date of Patent: Sep. 16, 2025

(54) ELECTRONIC DEVICE STORING MAPPING INFORMATION AND METHOD OF OPERATING THE SAME

(71) Applicant: SAMSUNG ELECTRONICS CO., LTD., Suwon-si (KR)

(72) Inventor: Sooyoung Ji, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 13 days.

(21) Appl. No.: 18/612,575

(22) Filed: Mar. 21, 2024

(65) Prior Publication Data

US 2025/0085878 A1 Mar. 13, 2025

(30) Foreign Application Priority Data

Sep. 12, 2023 (KR) ........................ 10-2023-0121212

(51) Int. Cl.
G06F 3/06 (2006.01)
(52) U.S. Cl.
CPC ............ G06F 3/064 (2013.01); G06F 3/0604 (2013.01); G06F 3/0656 (2013.01); G06F 3/067 (2013.01)
(58) Field of Classification Search
None
See application file for complete search history.

(56) References Cited

U.S. PATENT DOCUMENTS

| | | | |
|---|---|---|---|
| 10,409,511 B1 | 9/2019 | Subbarao et al. | |
| 11,200,193 B2 | 12/2021 | Haimzon et al. | |
| 11,269,538 B2 | 3/2022 | Oh | |
| 2018/0284990 A1 | 10/2018 | Kachare et al. | |
| 2019/0087352 A1 | 3/2019 | Lee et al. | |
| 2020/0257820 A1* | 8/2020 | Li | H04L 67/1097 |
| 2021/0263651 A1 | 8/2021 | Sandvig | |
| 2023/0017824 A1 | 1/2023 | Park et al. | |
| 2023/0110067 A1 | 4/2023 | Lagrange et al. | |

FOREIGN PATENT DOCUMENTS

EP 1517230 A2 3/2005

OTHER PUBLICATIONS

D. Das Sharma et al., "An Introduction to the Compute Express Link (CXL) Interconnect", 36 pages.

* cited by examiner

*Primary Examiner* — Brian R Peugh
(74) *Attorney, Agent, or Firm* — Morgan, Lewis & Bockius LLP

(57) ABSTRACT

Disclosed is a method of operating an electronic device which includes a first storage device, a second storage device, and a host device. The method includes providing a first request indicating a memory operation of target data to the first storage device, providing a second request indicating a redirection of the memory operation to the second storage device based on the first request, performing the memory operation based on the second request, providing the first storage device with a first completion response indicating that the memory operation is performed, and providing a second completion response to the host device based on the first completion response. The first storage device stores first mapping information of a logical block address (LBA) of the target data and a physical block address (PBA) indicating a physical block of the second storage device, in which the target data are stored.

20 Claims, 14 Drawing Sheets

ELECTRONIC DEVICE STORING MAPPING INFORMATION AND METHOD OF OPERATING THE SAME

CROSS-REFERENCE TO RELATED APPLICATIONS

This application claims priority under 35 U.S.C. § 119 to Korean Patent Application No. 10-2023-0121212, filed on Sep. 12, 2023 in the Korean Intellectual Property Office, the disclosure of which is incorporated by reference herein in its entirety.

TECHNICAL FIELD

Embodiments of the present disclosure relate to a storage device, and more particularly, to an electronic device storing mapping information and a method of operating the same.

DISCUSSION OF RELATED ART

A memory device stores data in response to a write request and outputs data stored therein in response to a read request. For example, a memory device may be classified as a volatile memory device, which loses data stored therein when power is turned off, such as a dynamic random access memory (DRAM) device or a static RAM (SRAM) device, or a non-volatile memory device, which retains data stored therein even when power is turned off, such as a flash memory device, a phase-change RAM (PRAM), a magnetic RAM (MRAM), or a resistive RAM (RRAM). A non-volatile memory device may be used as a storage device storing a large amount of data.

SUMMARY

Embodiments of the present disclosure provide an electronic device storing mapping information and a method of operating the same.

According to an embodiment, an electronic device includes a first storage device, a second storage device, and a host device. A method of operating the electronic device includes providing, by the host device, a first request indicating a memory operation of target data to the first storage device, providing, by the first storage device, a second request indicating a redirection of the memory operation to the second storage device based on the first request, performing, by the second storage device, the memory operation based on the second request, providing, by the second storage device, the first storage device with a first completion response indicating that the memory operation is performed, and providing, by the first storage device, a second completion response to the host device based on the first completion response. Before the first request is received from the host device or after the first completion response is received from the second storage device, the first storage device stores first mapping information of a logical block address (LBA) of the target data and a physical block address (PBA) indicating a physical block of the second storage device, in which the target data are stored.

According to an embodiment, an electronic device includes a first storage device, a second storage device, and a host device. A method of operating the electronic device includes sharing, by the first and second storage devices, first status information of the first storage device and second status information of the second storage device, providing, by the host device, the first storage device with a first request indicating a write operation of target data, the first request including a logical block address (LBA) of the target data, providing, by the first storage device, the second storage device with a second request indicating a redirection of the write operation based on the first request, the first status information, and the second status information, performing, by the second storage device, the write operation based on the second request, providing, by the second storage device, the first storage device with a first completion response indicating that the write operation is performed, the first completion response including a physical block address (PBA) indicating a physical block of the second storage device, in which the target data are stored, storing, by the first storage device, mapping information of the LBA and the PBA of the second storage device based on the first request and the first completion response, and providing, by the first storage device, a second completion response to the host device based on the first completion response.

According to an embodiment, an electronic device includes a first storage device that includes a first command manager, a mapping table, and a first non-volatile memory device, a second storage device that includes a second command manager and a second non-volatile memory device, and a host device that generates a first request indicating a memory operation of target data. The first command manager provides the second storage device with a second request indicating a redirection of the memory operation based on the first request. The second command manager performs the memory operation based on the second request and provides the first storage device with a first completion response indicating that the memory operation is performed. The first command manager provides a second completion response to the host device based on the first completion response. The mapping table stores mapping information of a logical block address (LBA) of the target data and a physical block address (PBA) indicating a physical block of the second non-volatile memory device, in which the target data are stored.

BRIEF DESCRIPTION OF THE DRAWINGS

The above and other objects and features of the present disclosure will become more apparent by describing in detail embodiments thereof with reference to the accompanying drawings.

DETAILED DESCRIPTION

Figure 1:
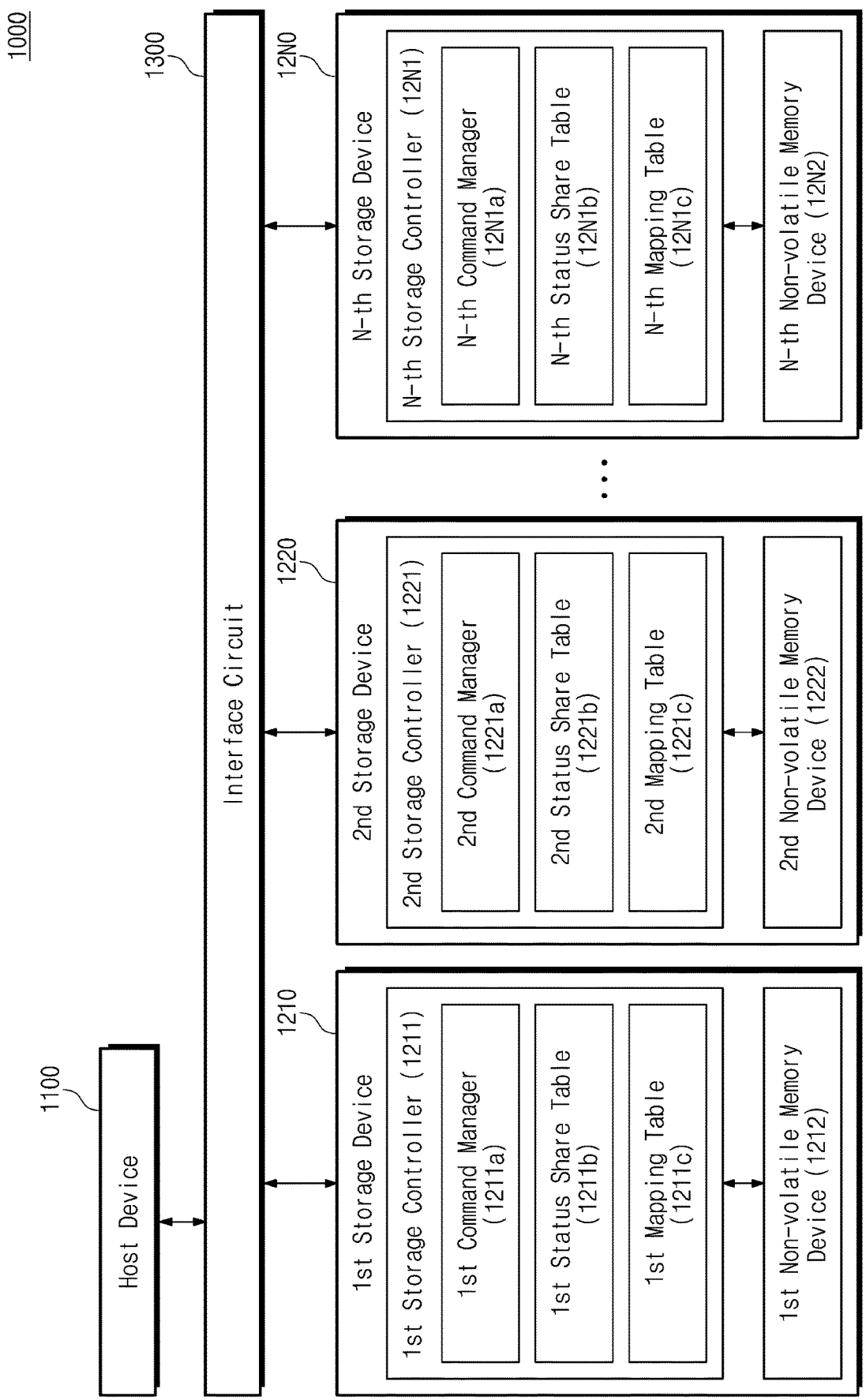
FIG. 1 is a block diagram of an electronic device, according to embodiments of the present disclosure.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

FIG. 1 is a block diagram of an electronic device, according to embodiments of the present disclosure.

Referring to FIG. 1, an electronic device 1000 may include a host device 1100, a plurality of storage devices 1210 to 12N0, and an interface circuit 1300. In some embodiments, the electronic device 1000 may be a computing system configured to process or store a variety of information. For example, the electronic device 1000 may be implemented with a personal computer (PC), a notebook, a laptop, a server, a workstation, a tablet PC, a smartphone, a digital camera, a black box, etc.

The host device 1100 may control an overall operation of the electronic device 1000. The host device 1100 may communicate with the plurality of storage devices 1210 to 12N0. For example, the host device 1100 may store data in the plurality of storage devices 1210 to 12N0 through the interface circuit 1300, may read the data stored in the plurality of storage devices 1210 to 12N0 through the interface circuit 1300, or may delete the data stored in the plurality of storage devices 1210 to 12N0 through the interface circuit 1300. The host device 1100 may be implemented with a processing unit such as, for example, a central processing unit (CPU), a graphic processing unit (GPU), a neural processing unit (NPU), etc.

The plurality of storage devices 1210 to 12N0 may be referred to as "first to N-th storage devices 1210 to 12N0". Herein, "N" is an arbitrary positive integer. Under control of the host device 1100, the first to N-th storage devices 1210 to 12N0 may store data received from the host device 1100, may provide the stored data to the host device 1100, or may delete the stored data.

The first storage device 1210 may include a first storage controller 1211 and a first non-volatile memory device 1212. The first storage controller 1211 may include a first command manager 1211a, a first status share table 1211b, and a first mapping table 1211c.

In some embodiments, each of the first command manager 1211a, the first status share table 1211b, and the first storage controller 1211 may be implemented with hardware, software, and a combination of hardware and software. When at least some of the first command manager 1211a, the first status share table 1211b, and the first storage controller 1211 are implemented by software, the first storage controller 1211 may include a processor and a volatile memory device, and the processor may implement functions of components implemented by software by executing instructions loaded to the volatile memory device.

The first command manager 1211a may process a request received from the host device 1100. For example, the first command manager 1211a may receive a request indicating a memory operation from the host device 1100, may process the received request, and may return a response indicating that the received request is processed to the host device 1100. The memory operation may be one of operations associated with data processing, such as, for example, a write operation, a read operation, and a delete operation. The response indicating that the request is processed may be referred to as a "completion" or a "completion response".

In some embodiments, the first command manager 1211a may redirect the request received from the host device 1100 to any other storage device. For example, the first command manager 1211a may receive a first request indicating the write operation from the host device 1100, may select the second storage device 1220 among the second to N-th storage devices 1220 to 12N0 with reference to status information of the first status share table 1211b, and may provide a second request indicating the redirection of the write operation to the second storage device 1220. The first command manager 1211a may receive a first completion response indicating that the redirected operation is processed from the second storage device 1220 and may provide a second completion response indicating that the write operation is processed to the host device 1100.

In some embodiments, the first command manager 1211a may receive a first request indicating the read operation of data stored in the second storage device 1220 being a redirection storage device from the host device 1100, may retrieve identification information of the second storage device 1220 from mapping information of the first mapping table 1211c, and may provide a second request indicating the redirection of the read operation to the second storage device 1220 based on the identification information. The first command manager 1211a may receive a first completion response indicating that the redirected operation is processed from the second storage device 1220 and may provide a second completion response indicating that the read operation is processed to the host device 1100.

In some embodiments, the first command manager 1211a may receive a first request indicating the delete operation of data stored in the second storage device 1220 being a redirection storage device from the host device 1100, may retrieve the identification information of the second storage device 1220 from the mapping information of the first mapping table 1211c, and may provide a second request indicating the redirection of the erase operation to the second storage device 1220 based on the identification information. The first command manager 1211a may receive a first completion response indicating that the redirected operation is processed from the second storage device 1220 and may provide a second completion response indicating that the delete operation is processed to the host device 1100.

The first status share table 1211*b* may store shared status information of the plurality of storage devices 1210 to 12N0. The status information may be information indicating whether a relevant storage device is suitable to process the request of the host device 1100. For example, the status information may include at least one of lifetime information, retention information, program/erase (P/E) cycle information, storage capacity information, and memory access count information of a relevant storage device.

For example, the first command manager 1211*a* may generate first status information of the first storage device 1210, may store the first status information in the first status share table 1211*b*, and may provide the first status information to the second to N-th storage devices 1220 to 12N0. The first command manager 1211*a* may receive second to N-th status information from the second to N-th storage devices 1220 to 12N0 and may store the second to N-th status information in the first status share table 1211*b*. The first to N-th status information stored in the first status share table 1211*b* may be used to select a storage device targeted for redirection from among the first to N-th storage devices 1210 to 12N0.

The first mapping table 1211*c* may store address mapping information. For example, under control of the first command manager 1211*a*, the first mapping table 1211*c* may store mapping information of a logical block address (LBA) and a physical block address (PBA). The LBA may refer to an address capable of being identified by the host device 1100. The PBA may refer to an address for identifying a physical block where data corresponding to the LBA are stored. The first mapping table 1211*c* may be referred to as a logical-to-physical (L2P) mapping table.

In some embodiments, the first mapping table 1211*c* may further store mapping information of any other redirection storage device. For example, when the first command manager 1211*a* redirects the request of the host device 1100 to any other storage device, the first command manager 1211*a* may store mapping information of the PBA of the storage device to which the request is redirected and the LBA in the first mapping table 1211*c*. In other words, the first mapping table 1211*c* may store not only mapping information about a physical block of the first storage device 1210, but also mapping information about a physical block of a storage device to which a request is redirected.

In some embodiments, the first mapping table 1211*c* may further store mapping information of any other storage device providing a request for redirection. For example, when a second command manager 1221*a* of the second storage device 1220 redirects the request of the host device 1100 to the first storage device 1210, the first command manager 1211*a* may store identification information of the second storage device 1220 and mapping information of the PBA corresponding to a physical block of the first storage device 1210 in the first mapping table 1211*c*, or may store mapping information of the LBA of data redirected from the second storage device 1220 and the PBA corresponding to the physical block of the first storage device 1210 in the first mapping table 1211*c*.

The first non-volatile memory device 1212 may store data under control of the first storage controller 1211. The first non-volatile memory device 1212 may retain data present therein even though power is turned off. The first non-volatile memory device 1212 may include a plurality of physical blocks. Each of the physical blocks may be a set of memory cells capable of storing data. Each physical block may be identified by the corresponding PBA. The first non-volatile memory device 1212 may be implemented with, for example, a flash memory device, a phase-change RAM (PRAM), a magnetic RAM (MRAM), a resistive RAM (RRAM), etc.

The second storage device 1220 may include a second storage controller 1221 and a second non-volatile memory device 1222. The second storage controller 1221 may include the second command manager 1221*a*, a second status share table 1221*b*, and a second mapping table 1221*c*. Operations of the second command manager 1221*a*, the second status share table 1221*b*, the second mapping table 1221*c*, and the second non-volatile memory device 1222 may be similar to the operations of the first command manager 1211*a*, the first status share table 1211*b*, the first mapping table 1211*c*, and the first non-volatile memory device 1212, respectively.

Similarly, the N-th storage device 12N0 may include an N-th storage controller 12N1 and an N-th non-volatile memory device 12N2. The N-th storage controller 12N1 may include an N-th command manager 12N1*a*, an N-th status share table 12N1*b*, and an N-th mapping table 12N1*c*. Operations of the N-th command manager 12N1*a*, the N-th status share table 12N1*b*, the N-th mapping table 12N1*c*, and the N-th non-volatile memory device 12N2 may be similar to the operations of the first command manager 1211*a*, the first status share table 1211*b*, the first mapping table 1211*c*, and the first non-volatile memory device 1212, respectively.

According to embodiments, each command manager described above may be implemented as a circuit.

The interface circuit 1300 may be connected to the host device 1100 and the first to N-th storage devices 1210 to 12N0. The interface circuit 1300 may provide an interface for an arbitrary combination of the host device 1100 and the first to N-th storage devices 1210 to 12N0.

In some embodiments, the interface circuit 1300 may be a Compute eXpress Link (CXL) interface circuit. For example, components arbitrarily combined from among the host device 1100 and the first to N-th storage devices 1210 to 12N0 may communicate with each other through the interface circuit 1300 in compliance with the CXL protocol.

As described above, according to embodiments of the present disclosure, a plurality of storage devices may share status information and may redirect a request of a host device based on the shared status information. As a storage device stores mapping information of an LBA and a PBA of a storage device to which the request is redirected, the workload may be distributed to a plurality of storage devices without the burden of management of the host device. In other words, storage devices may perform the load balancing without the intervention of the host device. The load balancing may make it possible to improve the lifetime of storage devices and to suppress a data delay due to the bottleneck.

Figure 2:
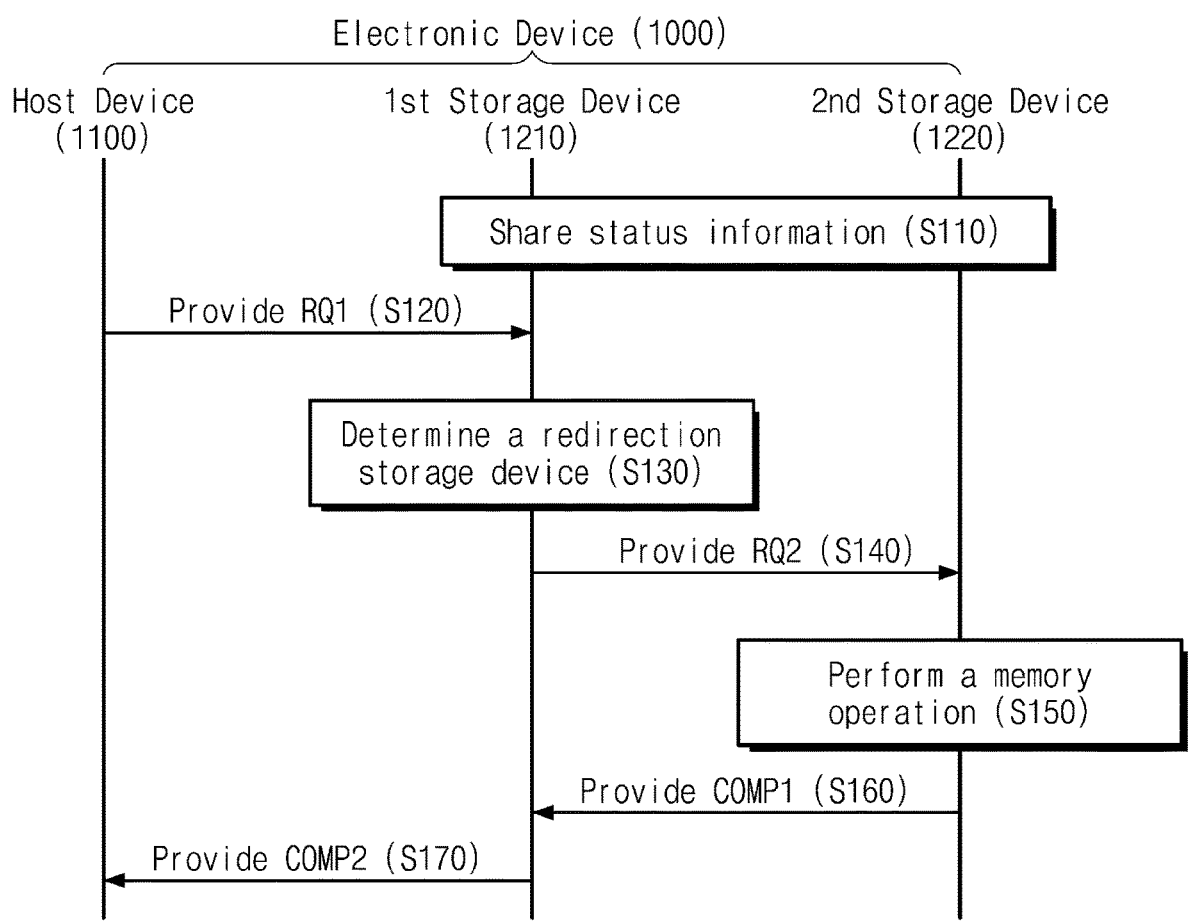
FIG. 2 is a flowchart describing a method of operating an electronic device, according to embodiments of the present disclosure.

FIG. 2 is a flowchart describing a method of operating an electronic device, according to embodiments of the present disclosure.

Referring to FIG. 2, the electronic device 1000 may include the host device 1100, the first storage device 1210, and the second storage device 1220. The host device 1100, the first storage device 1210, and the second storage device 1220 may respectively correspond to the host device 1100, the first storage device 1210, and the second storage device 1220 of FIG. 1.

In operation S110, the first and second storage devices 1210 and 1220 may share first status information of the first storage device 1210 and second status information of the second storage device 1220. For example, the first storage device 1210 may store the first status information and may provide the first status information to the second storage device 1220. The first status information may include at least one of pieces of information of the first storage device 1210, such as, for example, lifetime information, degradation information, and free capacity information. The second storage device 1220 may store the second status information and may provide the second status information to the first storage device 1210. The second status information may include at least one of pieces of information of the second storage device 1220, such as, for example, lifetime information, degradation information, and free capacity information.

In some embodiments, the first and second storage devices 1210 and 1220 may randomly share status information. For example, the first and second storage devices 1210 and 1220 may share status information periodically or randomly. Operation S110 may be further performed between operation S120 to operation S170, may be further performed in parallel with operation S120 to operation S170, and may be further performed after operation S170.

In operation S120, the host device 1100 may provide the first storage device 1210 with a first request RQ1 indicating the memory operation of target data. The memory operation may indicate an operation to be performed in the storage device, such as, for example, a write operation, a read operation, or a delete operation. The target data may have an LBA capable of being identified by the host device 1100. The first request RQ1 may include type information of the memory operation and the LBA of the target data. When the memory operation is the write operation or the read operation, the first request RQ1 may further include a host buffer address of a host buffer memory device of the host device 1100.

In operation S130, the first storage device 1210 may determine a redirection storage device. For example, when the memory operation of the first request RQ1 is the write operation, the first storage device 1210 may select the second storage device 1220 among the first and second storage devices 1210 and 1220 as a redirection storage device, based on the first status information and the second status information shared in operation S110.

In some embodiments, when the memory operation of the first request RQ1 is the read operation or the delete operation, the first storage device 1210 may retrieve identification information of the second storage device 1220 being the redirection storage device from the mapping information stored in the first mapping table 1211c, and may select the second storage device 1220 among the first and second storage devices 1210 and 1220 as a redirection storage device based on the found identification information.

In operation S140, the first storage device 1210 may provide the second storage device 1220 selected as a redirection storage device with a second request RQ2 indicating the redirection of the memory operation. The second request RQ2 may include type information of the memory operation. The second request RQ2 may further include at least one of the LBA of the target data or the identification information of the first storage device 1210 providing the second request RQ2. When the memory operation is the write operation or the read operation, the second request RQ2 may further include a host buffer address of the host buffer memory device of the host device 1100.

In some embodiments, the first storage device 1210 may provide the second request RQ2 to the second storage device 1220 through the interface circuit 1300 of FIG. 1 in a peer-to-peer (P2P) scheme. The transfer of the second request RQ2 may remove a burden that would otherwise be caused on the host device 1100.

In operation S150, the second storage device 1220 may perform the memory operation of the target data. For example, when the memory operation is the write operation, the second storage device 1220 may establish (or enable) a data channel between the host device 1100 and the second storage device 1220 based on the host buffer address of the second request RQ2, may receive the target data for the write operation through the established (or enabled) data channel, and may store the target data.

In some embodiments, when the memory operation is the read operation, the second storage device 1220 may establish the data channel between the host device 1100 and the second storage device 1220 based on the host buffer address of the second request RQ2, and may provide the target data for the read operation through the established data channel.

In some embodiments, when the memory operation is the delete operation, the second storage device 1220 may delete mapping information of a PBA of a physical block where the target data are stored. Subsequently, the second storage device 1220 may perform a physical erase operation on the physical block depending on an internal operating policy. Alternatively, assuming that the unit of an erase block where the erase operation is to be performed is larger than the unit of a physical block, when all data of the erase block including the physical block are invalid, the second storage device 1220 may perform the physical erase operation on the erase block.

In operation S160, the second storage device 1220 may provide a first completion response COMP1 to the first storage device 1210. The first completion response COMP1 may be a response signal indicating that the second request RQ2 is processed. For example, when the memory operation is the write operation, the first completion response COMP1 may include a PBA of a physical block where the target data are stored through the write operation. The first storage device 1210 may store mapping information of the LBA and the PBA of the second storage device 1220 based on the first request RQ1 and the first completion response COMP1.

In some embodiments, when the memory operation is the delete operation, the first storage device 1210 may delete the mapping information of the LBA and the PBA of the second storage device 1220 based on the first request RQ1 and the first completion response COMP1.

In some embodiments, the second storage device 1220 may provide the first completion response COMP1 to the first storage device 1210 through the interface circuit 1300 of FIG. 1 in the P2P scheme. The transfer of the first completion response COMP1 may remove a burden that would otherwise be caused on the host device 1100.

In some embodiments, before the first storage device 1210 receives the first request RQ1 from the host device 1100 or after the first storage device 1210 receives the first completion response COMP1 from the second storage device 1220, the first storage device 1210 may store the mapping information of the LBA of the target data of the first request RQ1 and the PBA of the physical block of the second storage device 1220, which stores the target data.

For example, when the memory operation of the first request RQ1 is the write operation, the first storage device 1210 may store the mapping information of the LBA of the target data and the PBA of the physical block of the second storage device 1220, which stores the target data, based on the first completion response COMP1 received from the second storage device 1220.

In some embodiments, when the memory operation of the first request RQ1 is the read operation or the delete operation, the first storage device 1210 may receive a relevant completion response from the second storage device 1220 in a previous write operation of the target data before the first request RQ1 is received from the host device 1100, and may store the mapping information of the LBA of the target data and the PBA of the physical block of the second storage device 1220, which stores the target data, based on the received completion response.

In operation S170, the first storage device 1210 may provide a second completion response COMP2 to the host device 1100 based on the first completion response COMP1. The second completion response COMP2 may be a response signal indicating that the first request RQ1 is processed.

Figure 3:
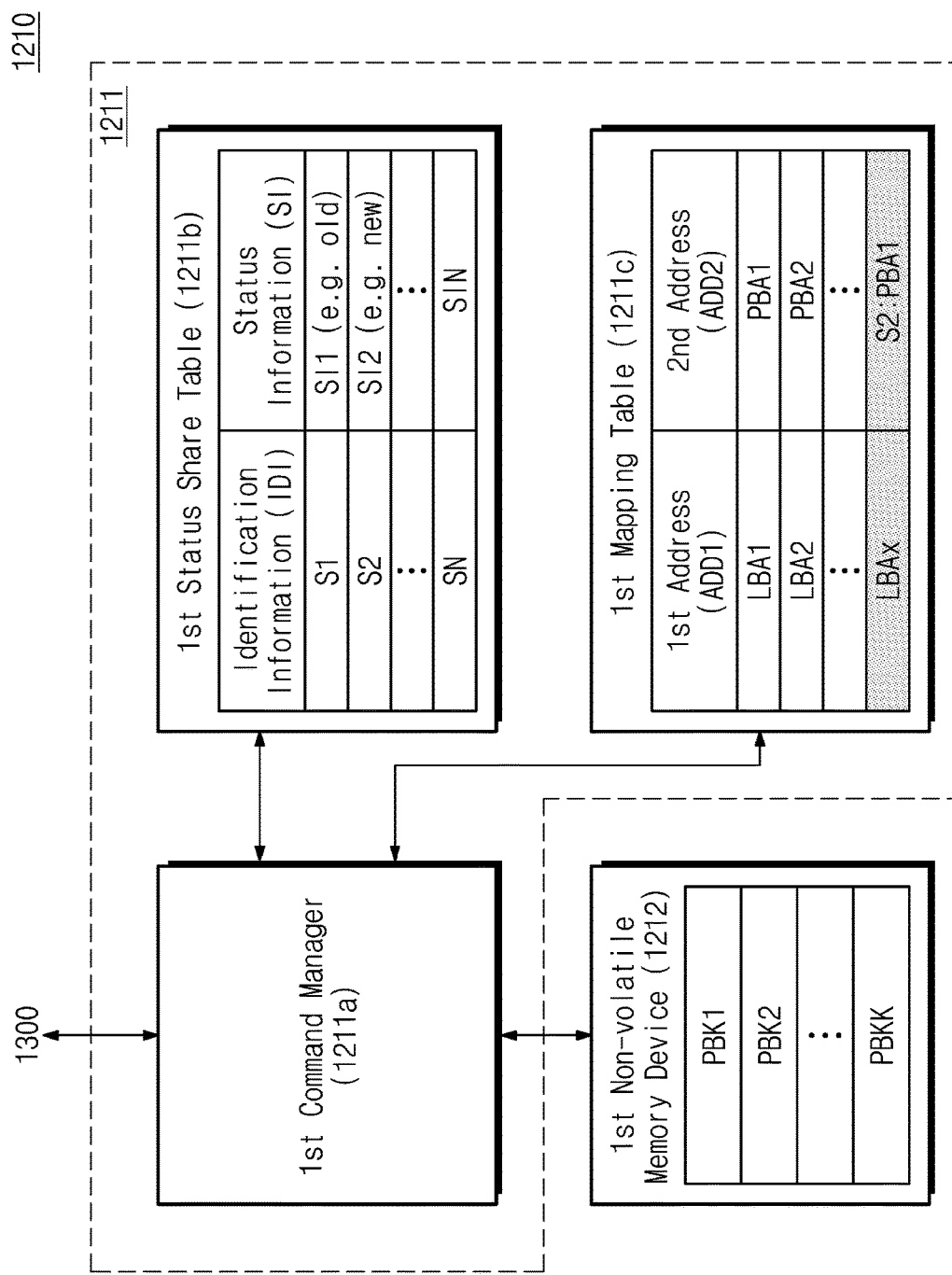
FIG. 3 is a block diagram describing a first storage device of FIG. 1, according to embodiments of the present disclosure.

FIG. 3 is a block diagram describing a first storage device of FIG. 1, according to embodiments of the present disclosure.

Referring to FIGS. 1 and 3, the first storage device 1210 may communicate with the host device 1100 and the second to N-th storage devices 1220 to 12N0 through the interface circuit 1300. For convenience of explanation, in FIG. 3, it is assumed that the first storage device 1210 is a device redirecting a request from the host device 1100 to the second storage device 1220.

The first storage device 1210 may include the first storage controller 1211 and the first non-volatile memory device 1212. The first storage controller 1211 may include the first command manager 1211a, the first status share table 1211b, and the first mapping table 1211c.

The first command manager 1211a may receive a first request indicating the memory operation of target data from the host device 1100 through the interface circuit 1300. The first request may include a target logical block address LBAx of the target data. The first command manager 1211a may search the first status share table 1211b based on the first request and may provide a second request indicating the redirection of the memory operation to the second storage device 1220 through the interface circuit 1300.

The first status share table 1211b may store status information of the plurality of storage devices 1210 to 12N0. For example, the first status share table 1211b may include an identification information (IDI) item and a status information (SI) item that have a mapping relationship. Referring to the identification information (IDI) item, a plurality of identification information S1 to SN of the plurality of storage devices 1210 to 12N0 may be listed. Identification information may be used to identify the corresponding storage device among the plurality of storage devices 1210 to 12N0. Referring to the status information (SI) item, a plurality of status information SI1 to SIN of the plurality of storage devices 1210 to 12N0 may be listed. Status information may include at least one of pieces of information of the corresponding storage device, such as, for example, lifetime information, degradation information, and free capacity information.

The first command manager 1211a may receive a first completion response from the second storage device 1220 through the interface circuit 1300. The first completion response may correspond to the second request indicating the redirection. When the memory operation is the write operation, the first completion response may include a first physical block address PBA1 of a physical block of the second storage device 1220, in which the redirected data are stored. The first command manager 1211a may update the first mapping table 1211c based on the first completion response.

The first mapping table 1211c may include a first address (ADD1) item and a second address (ADD2) item that have a mapping relationship. The first address (ADD1) item may be used to store an LBA, and the second address (ADD2) item may be used to store a PBA. However, the first address (ADD1) item and the second address (ADD2) item are not limited thereto, and may be used to store any other addresses or any other information.

For example, the first mapping table 1211c may store mapping information of a first logical block address LBA1 and the first physical block address PBA1. The first mapping table 1211c may store mapping information of a second logical block address LBA2 and a second physical block address PBA2. The first mapping table 1211c may store mapping information of the target logical block address LBAx of the target data and the first physical block address PBA1 of the second storage device 1220 being a redirection storage device. In this case, information of the second address (ADD2) item for the first physical block address PBA1 of the second storage device 1220 may include both the second identification information S2 indicating the second storage device 1220 and the first physical block address PBA1 indicating the physical block of the second storage device 1220.

That is, the first mapping table 1211c may store not only mapping information about a PBA of a physical block of the first storage device 1210, but also mapping information about a PBA of a physical block of the second storage device 1220.

The first command manager 1211a may manage data stored in the first non-volatile memory device 1212. The first non-volatile memory device 1212 may include a plurality of physical blocks PBK1 to PBKK. Herein, "K" is an arbitrary positive integer. The first command manager 1211a may store data in the plurality of physical blocks PBK1 to PBKK of the first non-volatile memory device 1212 and may update the first status share table 1211b and the first mapping table 1211c. Also, the first command manager 1211a may read data stored in a relevant physical block among the plurality of physical blocks PBK1 to PBKK of the first non-volatile memory device 1212 with reference to relevant mapping information of the first mapping table 1211c.

Figure 4:
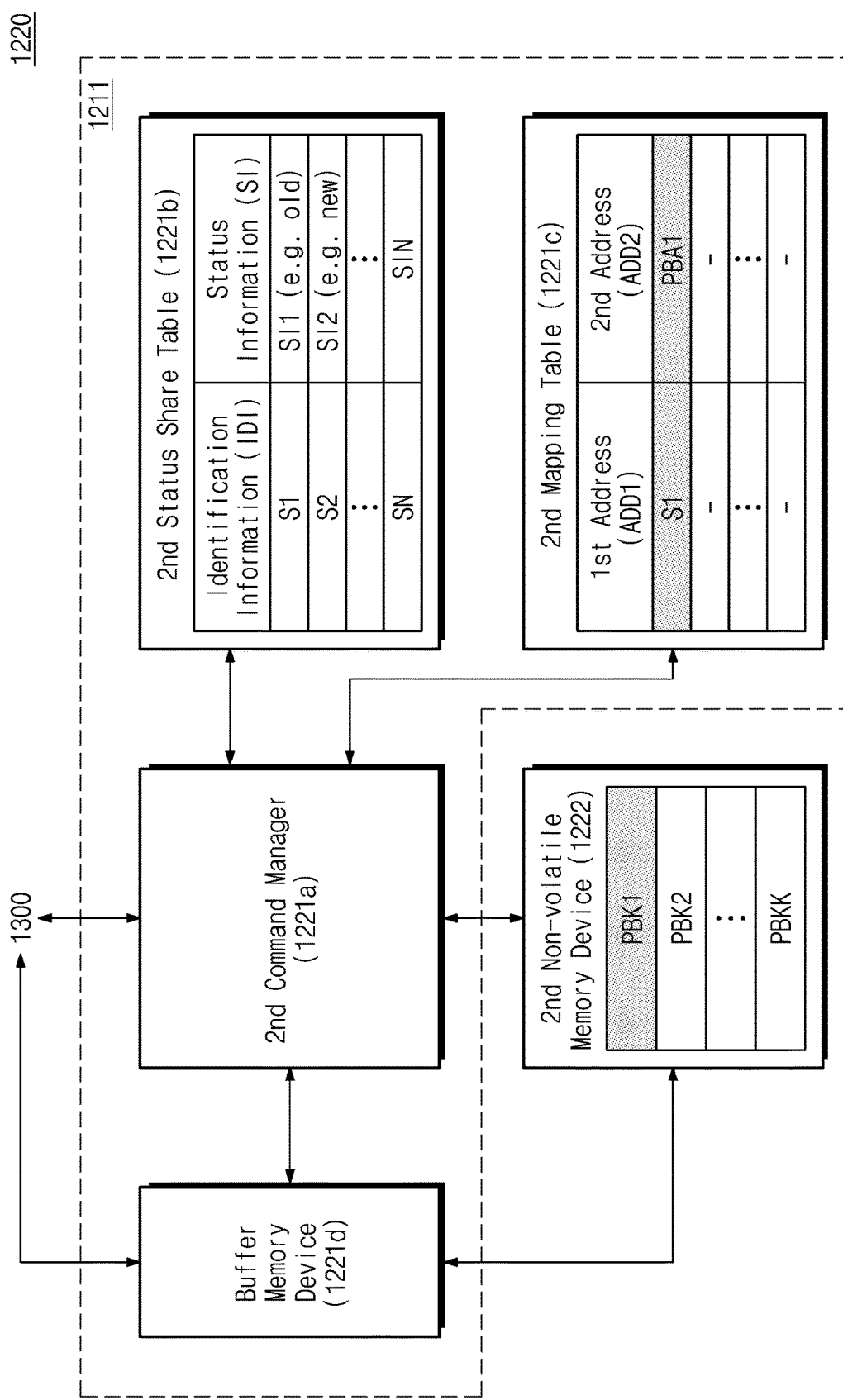
FIG. 4 is a block diagram describing a second storage device of FIG. 1, according to embodiments of the present disclosure.

FIG. 4 is a block diagram describing a second storage device of FIG. 1, according to embodiments of the present disclosure.

Referring to FIGS. 1 and 4, the second storage device 1220 may communicate with the host device 1100 and the first and third to N-th storage devices 1210 and 1230 to 12N0 through the interface circuit 1300. For convenience of explanation, in FIG. 4, it is assumed that the second storage device 1220 is a device processing a request redirected from the first storage device 1210.

The second storage device 1220 may include the second storage controller 1221 and the second non-volatile memory device 1222. The second storage controller 1221 may include the second command manager 1221a, the second status share table 1221b, the second mapping table 1221c, and a buffer memory device 1221d. The second non-volatile memory device 1222 may include a plurality of physical blocks PBK1 to PBKK. The second status share table 1221b is similar to the first status share table 1211b of FIG. 3, and thus, additional description thereof will be omitted to avoid redundancy.

The first storage device 1210 may receive a first request indicating the memory operation of target data from the host device 1100 and may generate a second request indicating the redirection of the first request. The second command manager 1221a may receive the second request from the first storage device 1210 through the interface circuit 1300.

The second command manager 1221a may perform the memory operation of the target data based on the second request. For example, when the memory operation is the write operation, based on a host buffer address of the second request, the second command manager 1221a may establish a data channel between the buffer memory device 1221d and the host buffer memory device of the host device 1100. The data channel may be implemented on the interface circuit 1300.

Under control of the second command manager 1221a, the buffer memory device 1221d may receive the target data corresponding to the write operation from the host device 1100 through the established data channel. The second command manager 1221a may store the target data loaded to the buffer memory device 1221d in the first physical block PBK1 of the second non-volatile memory device 1222. The second command manager 1221a may store mapping information of the first physical block address PBA1 of the first physical block PBK1 in the second mapping table 1221c.

For example, the second command manager 1221a may store mapping information of the first identification information S1 indicating the first storage device 1210 providing the second request RQ2 for redirection and the first physical block address PBA1 indicating the first physical block PBK1 storing the target data in the second mapping table 1221c.

However, the present disclosure is not limited thereto. For example, mapping information that is stored in the second mapping table 1221c may be implemented to be different from that illustrated in FIG. 4. For example, the second command manager 1221a may allocate an LBA for mapping information of the first physical block address PBA1 based on the second request and the internal operating policy, and may store mapping information of the allocated LBA and the first physical block address PBA1 in the second mapping table 1221c. The allocated LBA may be the same as a target logical block address of the target data of the first request or may be a separate address newly allocated to be different from the target logical block address.

Alternatively, the second command manager 1221a may store both the allocated LBA and the first identification information S1 as a value mapped to the first physical block address PBA1 in the second mapping table 1221c.

Referring again to the second command manager 1221a, when the memory operation is the read operation, the second command manager 1221a may retrieve the first physical block address PBA1 indicating the first physical block PBK1, in which the target data are stored, from the second mapping table 1221c based on the second request, may load the target data of the first physical block PBK1 of the second non-volatile memory device 1222 to the buffer memory device 1221d based on the first physical block address PBA1, and may establish the data channel between the buffer memory device 1221d and the host buffer memory device of the host device 1100 based on the host buffer address of the second request. The data channel may be implemented on the interface circuit 1300. Under control of the second command manager 1221a, the buffer memory device 1221d may provide the target data corresponding to the read operation to the host device 1100 through the established data channel.

In some embodiments, when the memory operation is the delete operation, the second command manager 1221a may retrieve the first physical block address PBA1 indicating the first physical block PBK1, in which the target data are stored, from the second mapping table 1221c based on the second request and may delete the mapping information of the first physical block address PBA1 and the first identification information S1.

Figure 5:
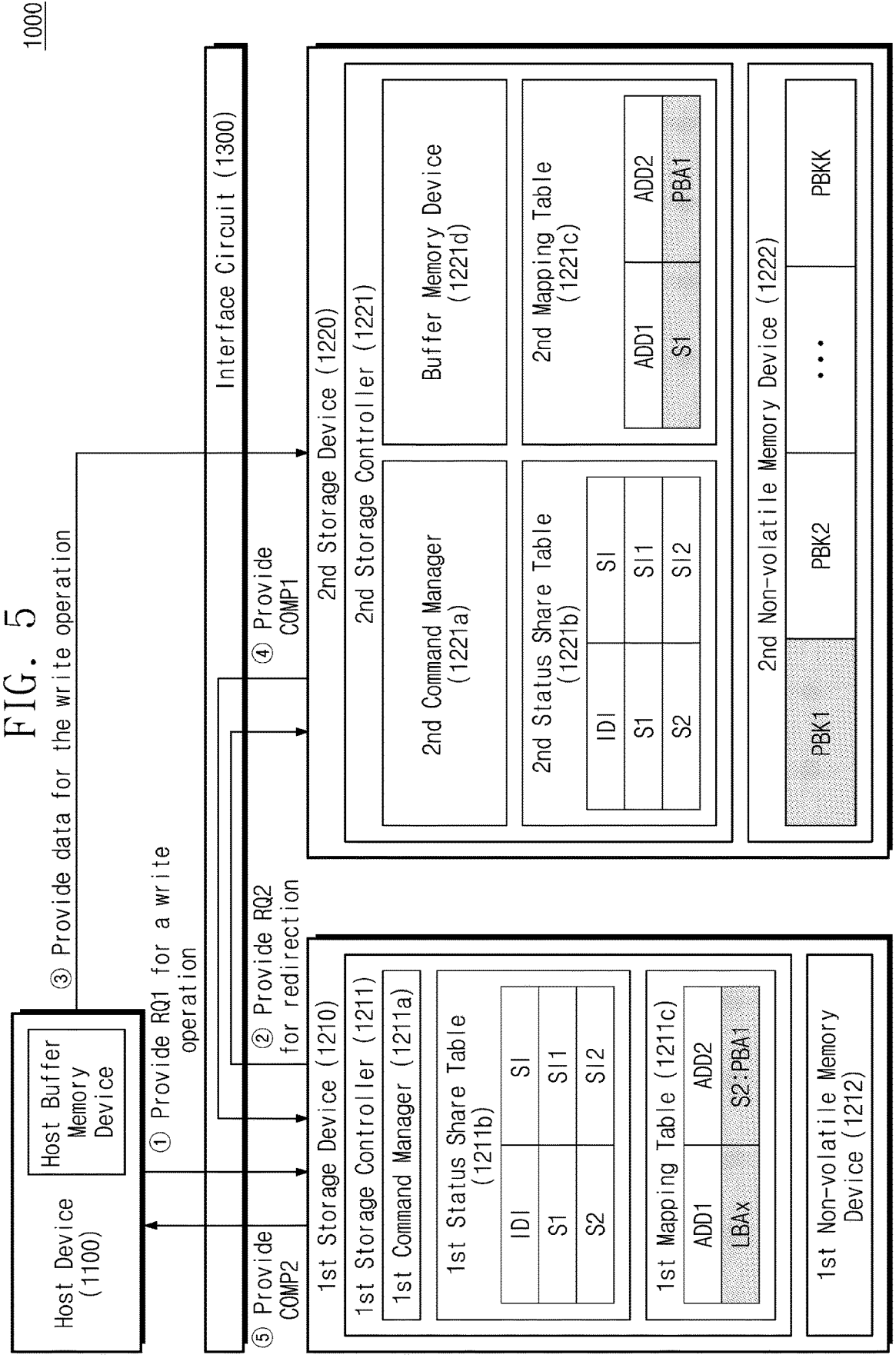
FIG. 5 is a diagram describing a write operation of an electronic device, according to embodiments of the present disclosure.

FIG. 5 is a diagram describing a write operation of an electronic device, according to embodiments of the present disclosure.

Referring to FIG. 5, the electronic device 1000 may perform the write operation. The electronic device 1000 may include the host device 1100, the first storage device 1210, the second storage device 1220, and the interface circuit 1300.

The host device 1100 may include a host buffer memory device. The host buffer memory device may store target data for the write operation. The target data may have the target logical block address LBAx and a host buffer address. The target logical block address LBAx may be an address capable of being identified by the host device 1100. The host buffer address may be used to identify the target data in the host buffer memory device through data communication.

The first storage device 1210 may include the first storage controller 1211 and the first non-volatile memory device 1212. The first storage controller 1211 may include the first command manager 1211a, the first status share table 1211b, and the first mapping table 1211c. The first status share table 1211b may include the identification information (IDI) item and the status information (SI) item. The first status share table 1211b may be updated as the first and second storage devices 1210 and 1220 share status information periodically or randomly. The first mapping table 1211c may include the first address (ADD1) item and the second address (ADD2) item.

The second storage device 1220 may include the second storage controller 1221 and the second non-volatile memory device 1222. The second storage controller 1221 may include the second command manager 1221a, the second status share table 1221b, the second mapping table 1221c, and the buffer memory device 1221d. The way to update the second status share table 1221b may be similar to the way to update the first status share table 1211b. The second mapping table 1221c may include the first address (ADD1) item and the second address (ADD2) item. The second non-volatile memory device 1222 may include the plurality of physical blocks PBK1 to PBKK.

The interface circuit 1300 may provide an interface for an arbitrary combination of the host device 1100, the first storage device 1210, and the second storage device 1220. Below, the write operation of the electronic device 1000 will be described.

In a first operation ①, the host device 1100 may provide the first storage device 1210 with the first request RQ1 indicating the write operation of the target data. The first request RQ1 may include the host buffer address and the target logical block address LBAx of the target data.

In a second operation ②, in response to the first request RQ1, the first command manager 1211a may retrieve the first status information SI1 and the second status information SI2 of the first status share table 1211b and may select the second storage device 1220 among the first and second storage devices 1210 and 1220 as a redirection storage device. The first command manager 1211a may provide the second request RQ2 indicating the redirection of the write operation of the target data to the second storage device 1220 selected as a redirection storage device. The second request RQ2 may include the host buffer address.

In a third operation ③, the host device 1100 may provide the second storage device 1220 with the target data corresponding to the write operation. For example, the second command manager 1221a may establish the data channel between the host buffer memory device of the host device 1100 and the buffer memory device 1221d of the second storage device 1220 based on the host buffer address of the second request RQ2. Under control of the second command manager 1221a, the buffer memory device 1221d may receive the target data from the host buffer memory device through the established data channel. The second command manager 1221a may store the target data buffered in the buffer memory device 1221d in the first physical block PBK1 of the second non-volatile memory device 1222.

In some embodiments, the storing of the target data in the first physical block PBK1 may include storing mapping information. For example, after the target data buffered in the buffer memory device 1221d are stored in the first physical block PBK1 of the second non-volatile memory device 1222, the second command manager 1221a may store mapping information of the first identification information S1 indicating the first storage device 1210 and the first physical block address PBA1 indicating the first physical block PBK1 in the second mapping table 1221c.

In some embodiments, the second command manager 1221a may newly allocate a separate LBA for the mapping information of the first physical block address PBA1 based on the second request RQ2 and the internal operating policy. For example, after the target data are stored in the first physical block PBK1, the second command manager 1221a may store mapping information of the separately allocated LBA and the first physical block address PBA1 indicating the first physical block PBK1 in the second mapping table 1221c.

In a fourth operation ④, the second command manager 1221a may provide the first storage device 1210 with the first completion response COMP1 indicating that the second request RQ2 is processed. The first completion response COMP1 may include the first physical block address PBA1 indicating the first physical block PBK1 where the target data are stored.

In a fifth operation ⑤, based on the first request RQ1 and the first completion response COMP1, the first command manager 1211a may store mapping information of the target logical block address LBAx of the target data and the first physical block address PBA1 of the second storage device 1220 in the first mapping table 1211c. In this case, information of the second address (ADD2) item may include both the second identification information S2 indicating the second storage device 1220 and the first physical block address PBA1 indicating the first physical block PBK1 of the second storage device 1220. The first command manager 1211a may update the first mapping table 1211c and may then provide the host device 1100 with the second completion response COMP2 indicating that the first request RQ1 is processed.

Figure 6:
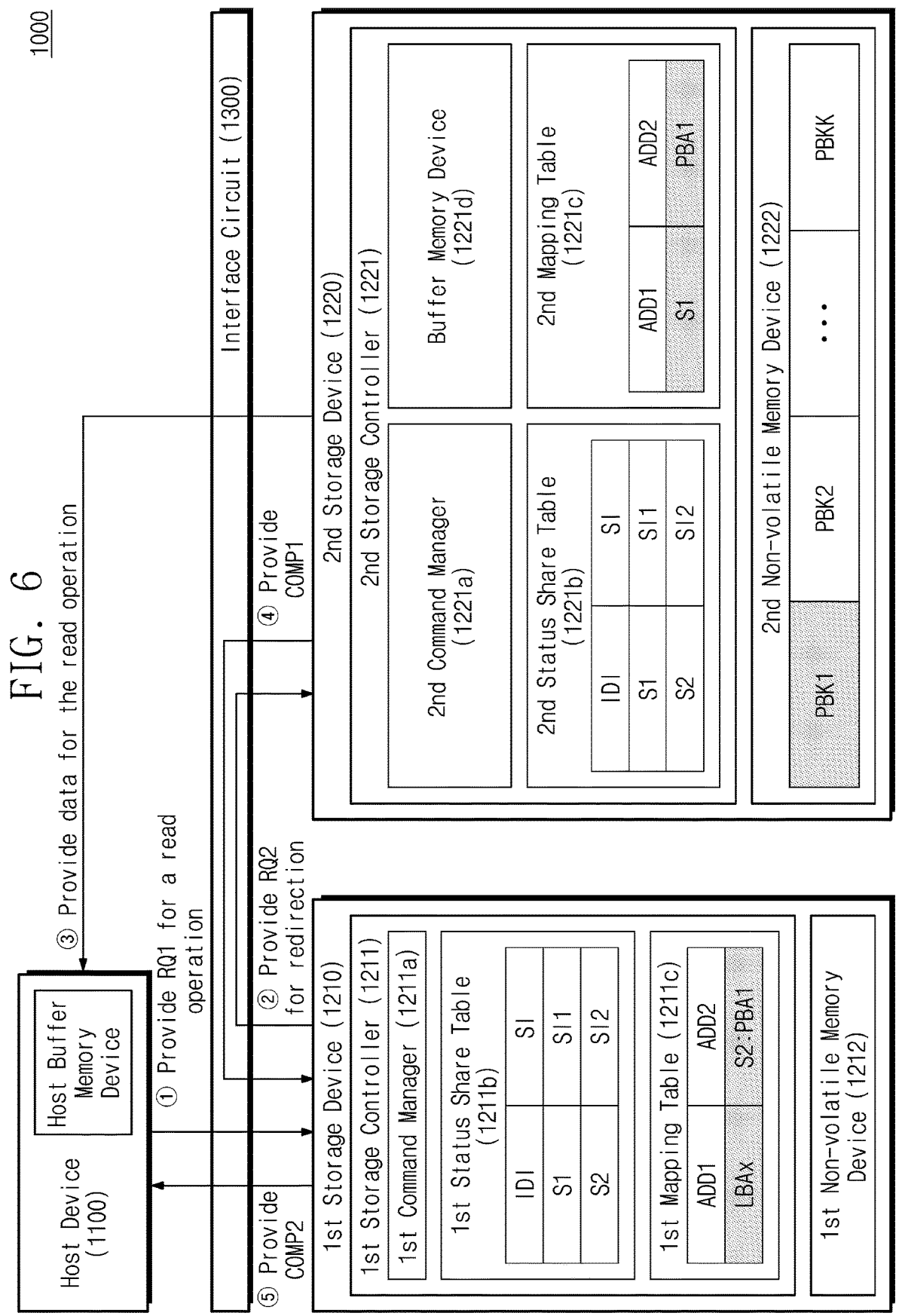
FIG. 6 is a diagram describing a read operation of an electronic device, according to embodiments of the present disclosure.

FIG. 6 is a diagram describing a read operation of an electronic device, according to embodiments of the present disclosure.

Referring to FIG. 6, the electronic device 1000 may perform the read operation. The electronic device 1000 may include the host device 1100, the first storage device 1210, the second storage device 1220, and the interface circuit 1300. The host device 1100, the first storage device 1210, the second storage device 1220, and the interface circuit 1300 are similar to the host device 1100, the first storage device 1210, the second storage device 1220, and the interface circuit 1300 of FIG. 5, respectively, and thus, additional description will be omitted to avoid redundancy.

Before the first storage device 1210 receives the first request RQ1 indicating the read operation of the target data, the first storage device 1210 may store the mapping information of the target logical block address LBAx of the target data and the first physical block address PBA1 indicating the first physical block PBK1 of the second storage device 1220, in which the target data are stored.

Before the first storage device 1210 receives the first request RQ1 indicating the read operation of the target data, the second storage device 1220 may store the target data in the first physical block PBK1.

Below, the read operation of the electronic device 1000 will be described.

In a first operation ①, the host device 1100 may provide the first storage device 1210 with the first request RQ1 indicating the read operation of the target data. The target data may be data stored in the first physical block PBK1 of the second non-volatile memory device 1222 of the second storage device 1220 in the write operation previously redirected. The first request RQ1 may include the host buffer address and the target logical block address LBAx of the target data.

In a second operation ②, in response to the first request RQ1, the first command manager 1211a may retrieve mapping information of the target logical block address LBAx from the first mapping table 1211c and may determine that the target data are stored in the second storage device 1220 being a redirection storage device, based on the mapping information. Based on the first request RQ1 and the found mapping information, the first command manager 1211a may provide the second request RQ2 indicating the redirection of the read operation of the target data to the second storage device 1220 being a redirection storage device. The second request RQ2 may include the host buffer address.

In a third operation ③, the second storage device 1220 may provide the host device 1100 with the target data corresponding to the read operation. For example, the second command manager 1221a may retrieve the first physical block address PBA1 from the mapping information stored in the second mapping table 1221c based on the second request RQ2 and may load the target data stored in the first physical block PBK1 of the second non-volatile memory device 1222 to the buffer memory device 1221d based on the first physical block address PBA1. For example, the second command manager 1221a may establish the data channel between the host buffer memory device of the host device 1100 and the buffer memory device 1221d of the second storage device 1220 based on the host buffer address of the second request RQ2. Under control of the second command manager 1221a, the buffer memory device 1221d may provide the target data to the host buffer memory device through the established data channel.

In a fourth operation ④, the second command manager 1221a may provide the first storage device 1210 with the first completion response COMP1 indicating that the second request RQ2 is processed.

In a fifth operation ⑤, based on the first completion response COMP1, the first command manager 1211a may provide the host device 1100 with the second completion response COMP2 indicating that the first request RQ1 is processed.

Figure 7:
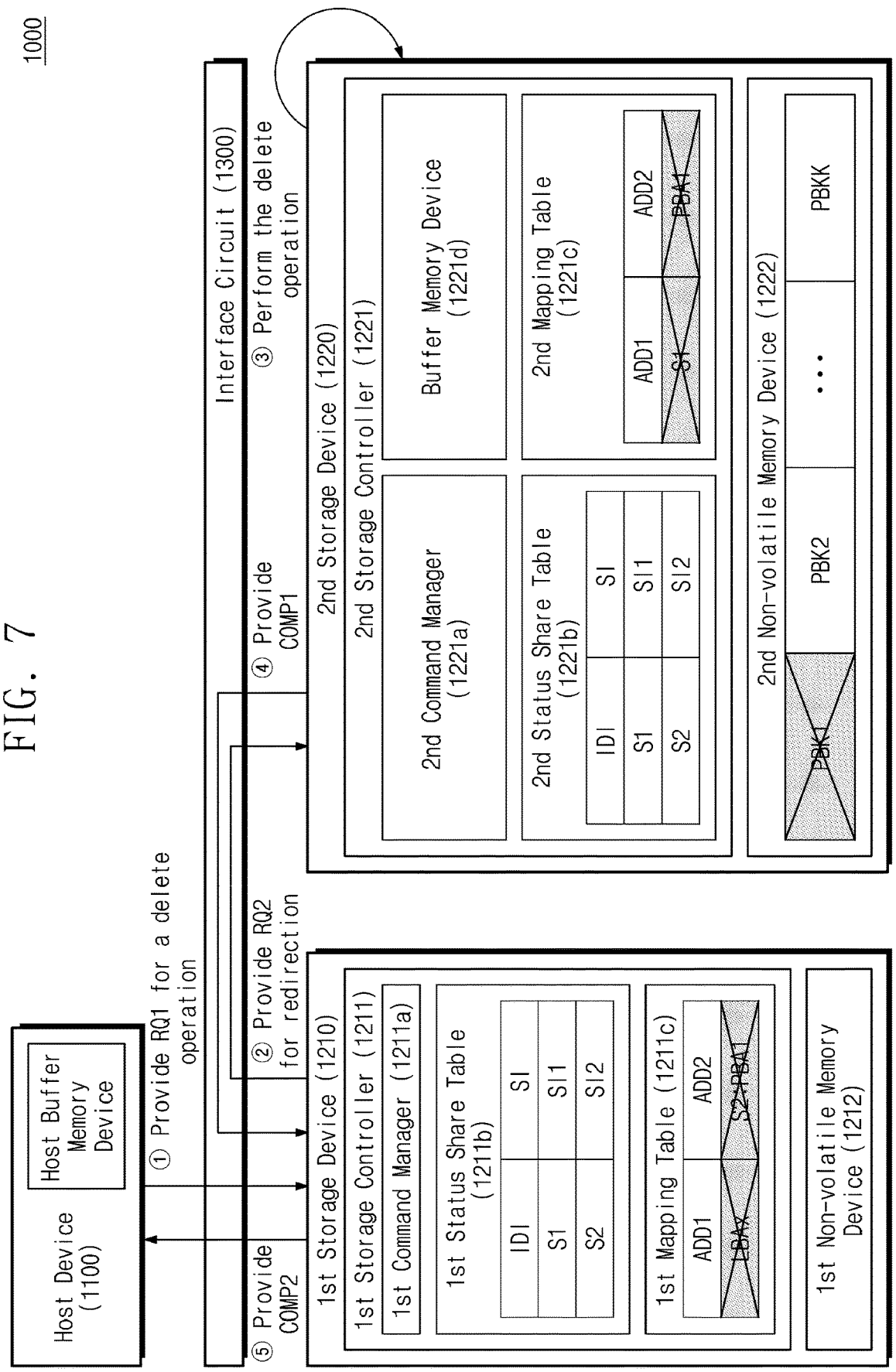
FIG. 7 is a diagram describing a delete operation of an electronic device, according to embodiments of the present disclosure.

FIG. 7 is a diagram describing a delete operation of an electronic device, according to embodiments of the present disclosure.

Referring to FIG. 7, the electronic device 1000 may perform the delete operation. The electronic device 1000 may include the host device 1100, the first storage device 1210, the second storage device 1220, and the interface circuit 1300. The host device 1100, the first storage device 1210, the second storage device 1220, and the interface circuit 1300 are similar to the host device 1100, the first storage device 1210, the second storage device 1220, and the interface circuit 1300 of FIG. 5, respectively, and thus, additional description will be omitted to avoid redundancy.

Before the first storage device 1210 receives the first request RQ1 indicating the delete operation of the target data, the first storage device 1210 may store the mapping information of the target logical block address LBAx of the target data and the first physical block address PBA1 indicating the first physical block PBK1 of the second storage device 1220, in which the target data are stored.

Before the first storage device 1210 receives the first request RQ1 indicating the delete operation of the target data, the second storage device 1220 may store the target data in the first physical block PBK1.

Below, the delete operation of the electronic device 1000 will be described.

In a first operation ①, the host device 1100 may provide the first storage device 1210 with the first request RQ1 indicating the delete operation of the target data. The target data may be data stored in the first physical block PBK1 of the second non-volatile memory device 1222 of the second storage device 1220 in the write operation previously redirected. The first request RQ1 may include the target logical block address LBAx of the target data.

In a second operation ②, in response to the first request RQ1, the first command manager 1211a may retrieve mapping information of the target logical block address LBAx from the first mapping table 1211c and may determine that the target data are stored in the second storage device 1220 being a redirection storage device, based on the mapping information. Based on the first request RQ1 and the found mapping information, the first command manager 1211a may provide the second request RQ2 indicating the redirection of the delete operation of the target data to the second storage device 1220 being a redirection storage device.

In a third operation ③, the second storage device 1220 may perform the delete operation of the target data. For example, based on the second request RQ2, the second command manager 1221a may delete the mapping information about the first physical block address PBA1 of the first physical block PBK1, in which the target data are stored, from the second mapping table 1221c. That is, the second command manager 1221a may delete the L2P mapping information of the target data. Subsequently, independently of a fourth operation ④ and a fifth operation ⑤, the second command manager 1221a may perform the physical erase operation of the first physical block PBK1 depending on the internal operating policy.

In the fourth operation ④, the second command manager 1221a may provide the first storage device 1210 with the first completion response COMP1 indicating that the second request RQ2 is processed.

In the fifth operation ⑤, based on the first completion response COMP1, the first command manager 1211a may delete the mapping information of the target logical block address LBAx of the target data and the first physical block address PBA1 of the second storage device 1220 from the first mapping table 1211c. After the first command manager 1211a deletes the mapping information about the target logical block address LBAx from the first mapping table 1211c, and the first command manager 1211a may provide the host device 1100 with the second completion response COMP2 indicating that the first request RQ1 is processed.

Figure 8:
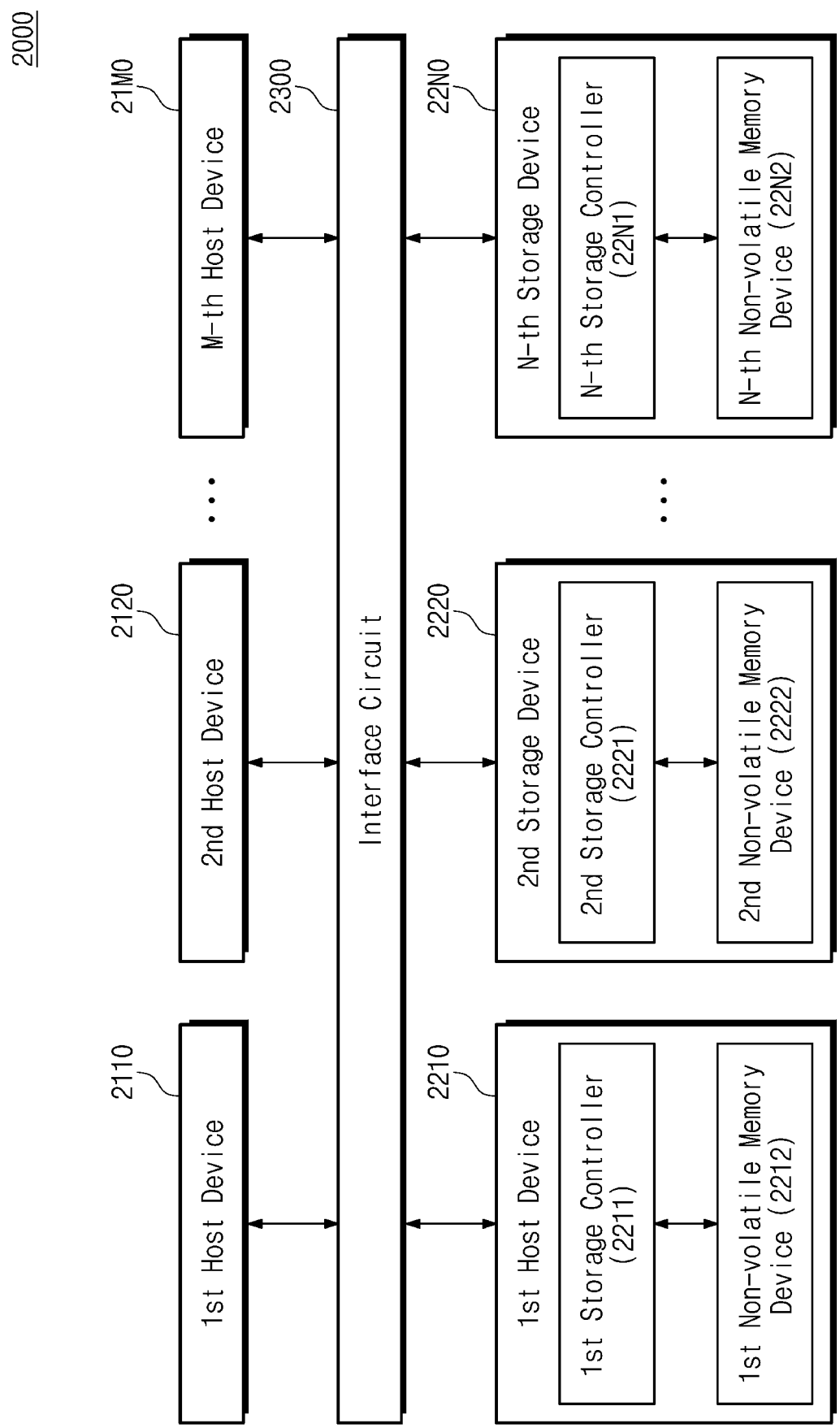
FIG. 8 is a block diagram of an electronic device, according to embodiments of the present disclosure.

FIG. 8 is a block diagram of an electronic device, according to embodiments of the present disclosure.

Referring to FIG. 8, an electronic device 2000 may include first to M-th host devices 2110 to 21M0, first to N-th storage devices 2210 to 22N0, and an interface circuit 2300. Herein, "M" is an arbitrary positive integer. The first to N-th storage devices 2210 to 22N0 and the interface circuit 2300 may respectively correspond to the first to N-th storage devices 1210 to 12N0 and the interface circuit 1300 of FIG. 1. Each of the first to M-th host devices 2110 to 21M0 may operate in a similar manner as the host device 1100 of FIG. 1.

In some embodiments, a plurality of storage devices may redirect requests from different host devices. For example, the first host device 2110 may provide the first storage device 2210 with the first request RQ1 indicating a first memory operation of first data. The first storage device 2210 may redirect the first request to the second storage device 2220. After the first request thus redirected is processed by the second storage device 2220, the first to N-th storage devices 2210 to 22N0 may share status information. Subsequently, the second host device 2120 may provide the second storage device 2220 with a second request indicating a second memory operation of second data. The second storage device 2220 may redirect the second request to one of the first and third to N-th storage devices 2210 and 2230 to 22N0 based on the shared status information.

As described above, according to embodiments of the present disclosure, the first to N-th storage devices 2210 to 22N0 may not only redirect a request provided from one host device, but the first to N-th storage devices 2210 to 22N0 may also redirect requests provided from the first to M-th host devices 2110 to 21M0. As such, even though some of the first to M-th host devices 2110 to 21M0 are removed from the electronic device 2000 or any other host device(s) is added to the electronic device 2000, the first to N-th storage devices 2210 to 22N0 may distribute the workload efficiently without the burden of management of the host device and a design change.

Figure 9:
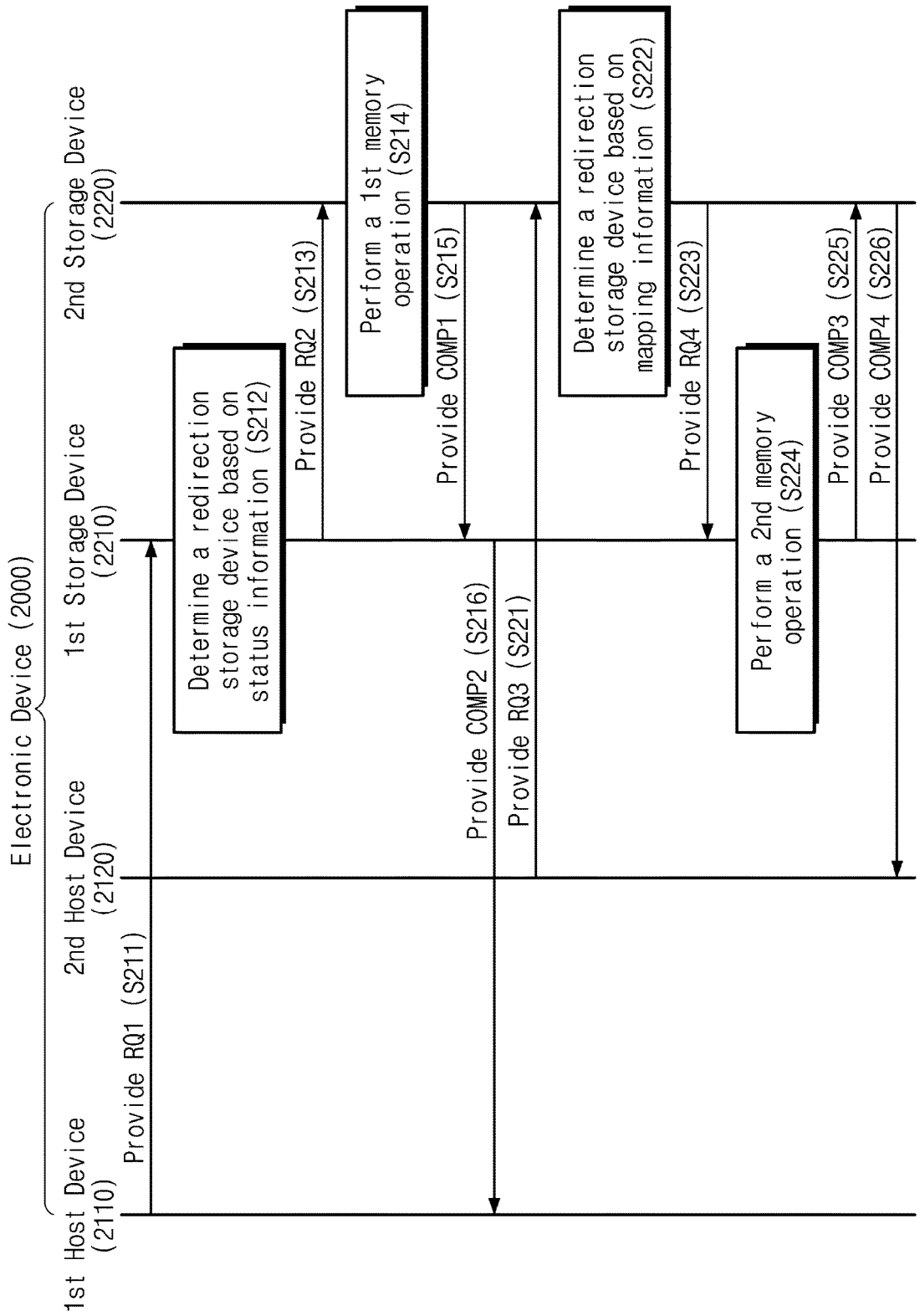
FIG. 9 is a flowchart describing a method of operating an electronic device, according to embodiments of the present disclosure.

FIG. 9 is a flowchart describing a method of operating an electronic device, according to embodiments of the present disclosure.

Referring to FIG. 9, the electronic device 2000 may include the first host device 2110, the second host device 2120, the first storage device 2210, and the second storage device 2220. The first storage device 2210 and the second storage device 2220 may share status information.

In operation S211, the first host device 2110 may provide the first storage device 2210 with the first request RQ1 indicating a first memory operation of first data. For example, the first memory operation may be the write operation.

In operation S212, the first storage device 2210 may determine a redirection storage device based on the status information. For example, before operation S212, the first and second storage devices 2210 and 2220 may share first status information of the first storage device 2210 and second status information of the second storage device 2220. The first storage device 2210 may determine the second storage device 2220 among the first and second storage devices 2210 and 2220 as a redirection storage device, based on the first status information and the second status information.

In operation S213, the first storage device 2210 may provide the second storage device 2220 with the second request RQ2 indicating the redirection of the first memory operation.

In operation S214, the second storage device 2220 may perform the first memory operation of the first data based on the second request RQ2. For example, the first memory operation may be the write operation. The second storage device 2220 may establish a data channel between the first host device 2110 and the second storage device 2220 based on a host buffer address included in the second request RQ2, may receive the first data through the established data channel, and may store the first data in a non-volatile memory device of the second storage device 2220. The second storage device 2220 may allocate an LBA for storing mapping information based on the second request RQ2 and the internal operating policy and may store mapping information of the allocated LBA and a PBA indicating a physical block where the first data are stored.

In operation S215, the second storage device 2220 may provide the first storage device 2210 with the first completion response COMP1 indicating that the first memory operation corresponding to the second request RQ2 is performed.

In operation S216, the first storage device 2210 may provide the second completion response COMP2 to the first host device 2110 based on the first completion response COMP1.

In operation S221, the second host device 2120 may provide the second storage device 2220 with a third request RQ3 indicating a second memory operation of second data. For example, the second memory operation may be the write operation. The third request RQ3 may include an LBA of the second data.

In some embodiments, the LBA of the first data stored in a mapping table of the second storage device 2220 may be the same as the LBA of the second data of the third request RQ3. For example, in operation S214, the second storage device 2220 may allocate an LBA for storing mapping information of the first data based on the second request RQ2 and the internal operating policy. The allocated LBA may be the same as the LBA of the second data of the third request RQ3.

In operation S222, the second storage device 2220 may determine a redirection storage device based on the third request RQ3 and the mapping information. For example, the LBA of the second data of the third request RQ3 may be the same as the LBA for the first data, which is stored in the mapping table of the second storage device 2220. Because the mapping information about the LBA the same as the LBA of the second data of the third request RQ3 is already stored, the second storage device 2220 may determine that the redirection of the third request RQ3 is required. The second storage device 2220 may determine the first storage device 2210 as a redirection storage device based on the mapping information stored in the mapping table.

However, the present disclosure is not limited thereto. For example, the second storage device 2220 may determine, as a redirection storage device, any other storage device (e.g., a third storage device) other than the first storage device 2210 providing the second request RQ2 indicating the redirection.

In operation S223, the second storage device 2220 may provide the first storage device 2210 with a fourth request RQ4 indicating the redirection of the second memory operation.

In operation S224, the first storage device 2210 may perform the second memory operation of the second data based on the fourth request RQ4. The second memory operation may be performed in a similar manner as the first memory operation in operation S214.

In operation S225, the first storage device 2210 may provide the second storage device 2220 with a third completion response COMP3 indicating that the second memory operation corresponding to the fourth request RQ4 is performed.

In operation S226, the second storage device 2220 may provide a fourth completion response COMP4 to the second host device 2120 based on the third completion response COMP3.

Figure 10:
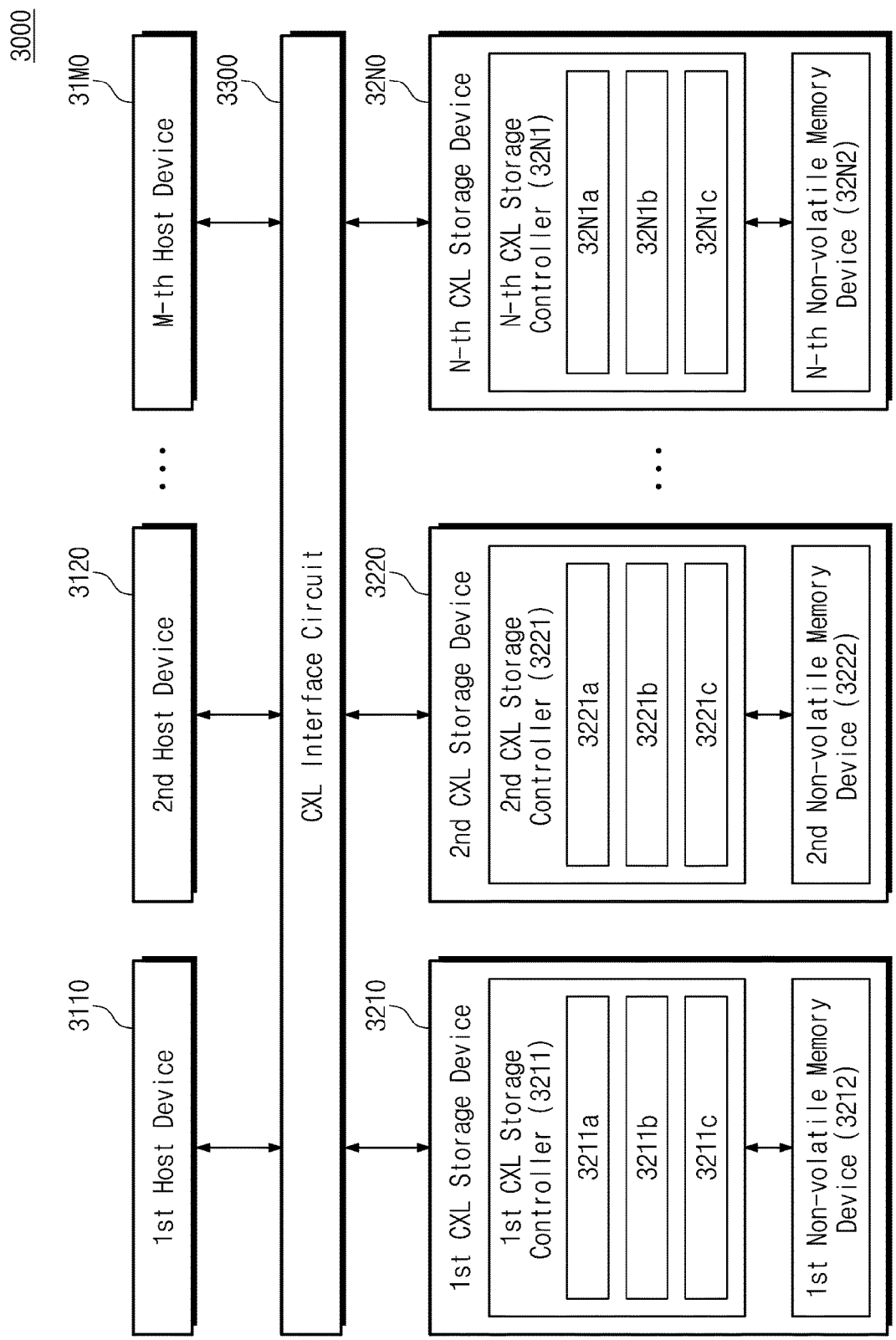
FIG. 10 is a block diagram of an electronic device supporting a Compute eXpress Link (CXL) protocol, according to embodiments of the present disclosure.

FIG. 10 is a block diagram of an electronic device supporting a CXL protocol, according to embodiments of the present disclosure.

Referring to FIG. 10, an electronic device 3000 may support the CXL protocol. The electronic device 3000 may include first to M-th host devices 3110 to 31M0, first to N-th CXL storage devices 3210 to 32N0, and a CXL interface circuit 3300. The first to M-th host devices 3110 to 31M0, the first to N-th CXL storage devices 3210 to 32N0, and the CXL interface circuit 3300 may respectively correspond to the first to M-th host devices 2110 to 21M0, the first to N-th storage devices 2210 to 22N0, and the interface circuit 2300 of FIG. 8.

The CXL interface circuit 3300 may be connected to the first to M-th host devices 3110 to 31M0 and the first to N-th CXL storage devices 3210 to 32N0. The CXL interface circuit 3300 may provide an interface for an arbitrary combination of the first to M-th host devices 3110 to 31M0 and the first to N-th CXL storage devices 3210 to 32N0.

The first CXL storage device 3210 may include a first CXL storage controller 3211 and a first non-volatile memory device 3212. The first CXL storage controller 3211 may include a first command manager 3211a, a first status share table 3211b, and a first mapping table 3211c. The first command manager 3211a, the first status share table 3211b, and the first mapping table 3211c are similar to the first command manager 1211a, the first status share table 1211b, and the first mapping table 1211c of FIG. 1, respectively, and thus, additional description will be omitted to avoid redundancy.

As in the above description, the second CXL storage device 3220 may include a second CXL storage controller 3221 and a second non-volatile memory device 3222. The second CXL storage controller 3221 may include a second command manager 3221a, a second status share table 3221b, and a second mapping table 3221c.

Similarly, the N-th CXL storage device 32N0 may include an N-th CXL storage controller 32N1 and an N-th non-volatile memory device 32N2. The N-th CXL storage controller 32N1 may include an N-th command manager 32N1a, an N-th status share table 32N1b, and an N-th mapping table 32N1c.

Figure 11:
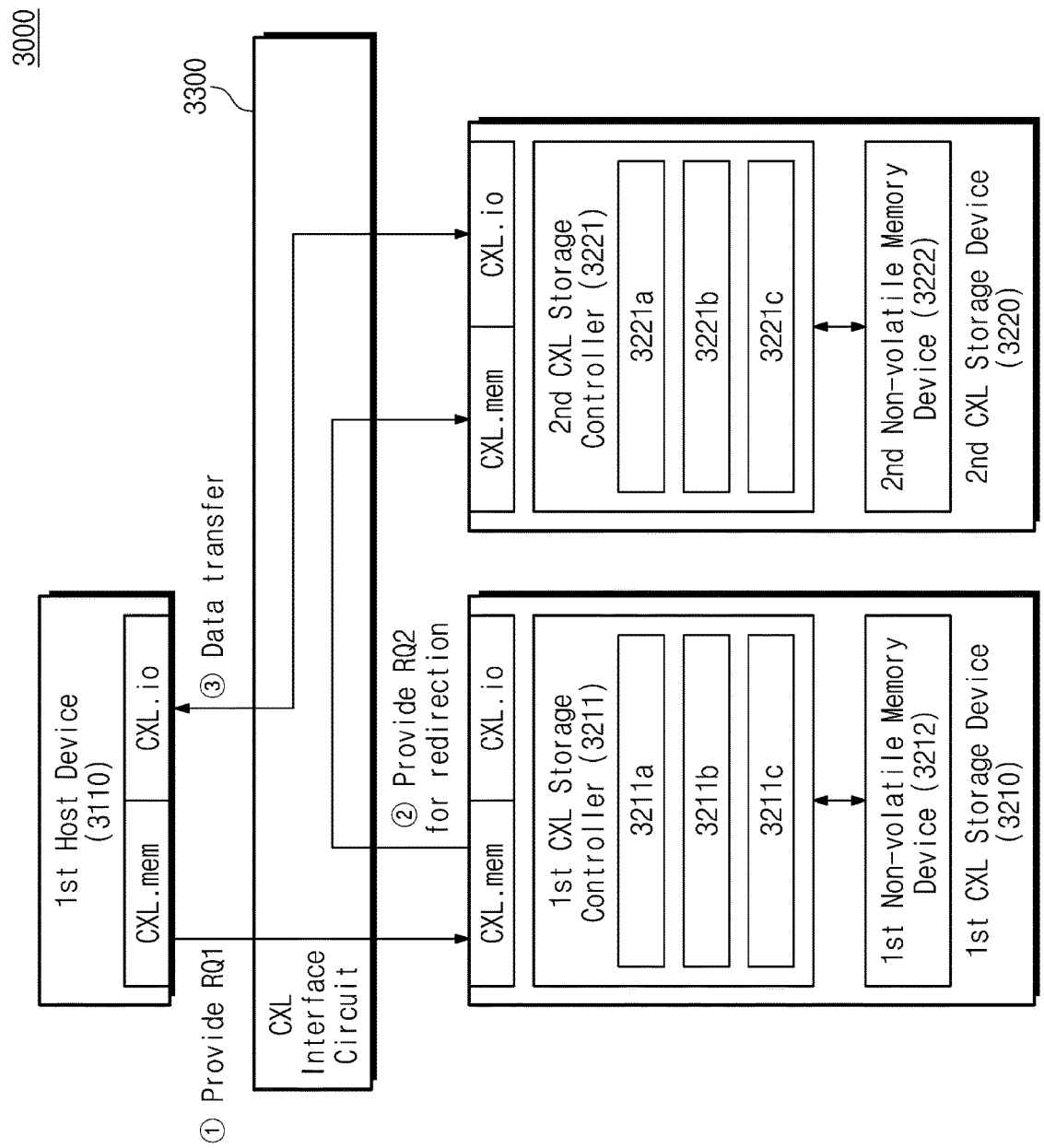
FIG. 11 is a diagram describing a method of operating an electronic device of FIG. 10, according to embodiments of the present disclosure.

FIG. 11 is a diagram describing a method of operating an electronic device of FIG. 10, according to embodiments of the present disclosure.

Referring to FIGS. 10 and 11, the electronic device 3000 may include the first host device 3110, the first CXL storage device 3210, the second CXL storage device 3220, and the CXL interface circuit 3300. The first CXL storage device 3210 may include the first CXL storage controller 3211 and the first non-volatile memory device 3212. The second CXL storage device 3220 may include the second CXL storage controller 3221 and the second non-volatile memory device 3222. Each of the first host device 3110, the first CXL storage device 3210, and the second CXL storage device 3220 may support the CXL.mem protocol and the CXL.io protocol.

Below, a method of operating the electronic device 3000 will be described.

In a first operation ①, the first host device 3110 may provide the first request RQ1 to the first CXL storage device 3210 through the CXL interface circuit in compliance with the CXL.mem protocol. The first request RQ1 may indicate the memory operation of target data. For example, the memory operation may be the write operation, the read operation, or the delete operation. When the memory operation is the write operation or the read operation, the first request RQ1 may include a host buffer address of the first host device 3110.

In a second operation ②, based on the first request RQ1, the first CXL storage controller 3211 may select the second CXL storage device 3220 among the first and second CXL storage devices 3210 and 3220 as a redirection storage device, based on status information stored in the first status share table 3211b or mapping information stored in the first mapping table 3211c. The first CXL storage controller 3211 may provide the second request RQ2 indicating the redirection of the memory operation to the second CXL storage device 3220 through the CXL interface circuit 3300 in compliance with the CXL.mem protocol. When the memory operation is the write operation or the read operation, the second request RQ2 may include a host buffer address of the first host device 3110.

In a third operation ③, the second CXL storage controller 3221 may establish a data channel between the first host device 3110 and the second CXL storage device 3220 based on the host buffer address of the second request RQ2, and may perform data communication (or data transfer) through the established data channel in compliance with the CXL.io protocol. The data channel may be implemented on the CXL interface circuit 3300.

For example, when the memory operation is the write operation, the first host device 3110 may provide data corresponding to the write operation to the second CXL storage device 3220 through the data channel implemented on the CXL interface circuit 3300 in compliance with the CXL.io protocol.

In some embodiments, when the memory operation is the read operation, the second storage device 3220 may provide data corresponding to the read operation to the first host device 3110 through the data channel implemented on the CXL interface circuit 3300 in compliance with the CXL.io protocol.

In some embodiments, when the memory operation is the delete operation, the second CXL storage device 3220 may omit the third operation ③ and may delete mapping information of target data stored in the second mapping table 3221c.

Figure 12:
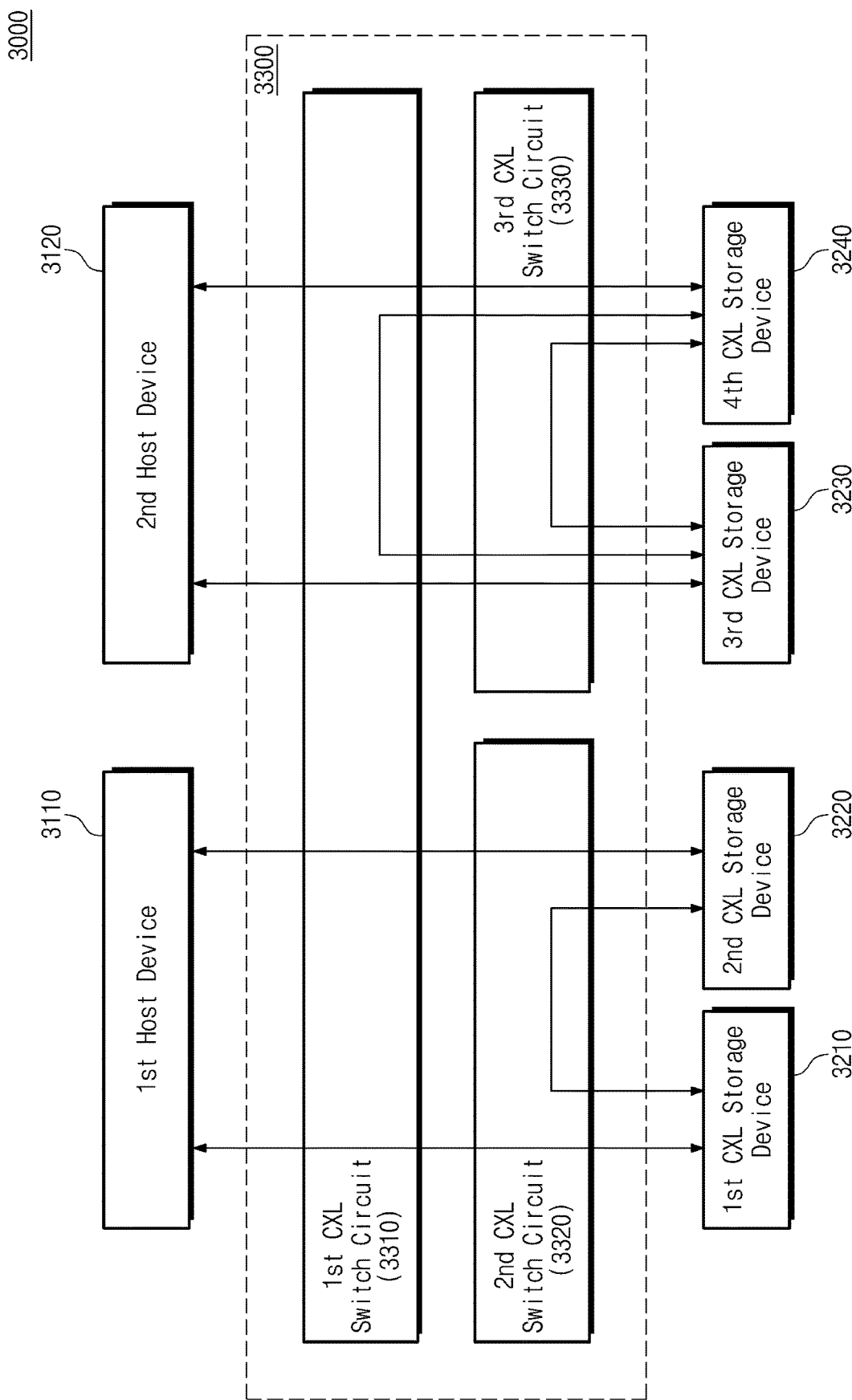
FIG. 12 is a diagram describing a CXL interface circuit of FIG. 10, according to embodiments of the present disclosure.

FIG. 12 is a diagram describing a CXL interface circuit of FIG. 10, according to embodiments of the present disclosure.

Referring to FIGS. 10 and 12, the electronic device 3000 may include the first host device 3110, the second host device 3120, the first to fourth CXL storage devices 3210, 3220, 3230, 3240, and the CXL interface circuit 3300.

The CXL interface circuit 3300 may have a multi-switch structure. For example, the CXL interface circuit 3300 may include a first CXL switch circuit 3310, a second CXL switch circuit 3320, and a third CXL switch circuit 3330. The multi-switch structure is provided only as an example for convenience of explanation, and the present disclosure is not limited thereto. For example, the number of CXL storage devices may increase or decrease, and the number of CXL switch circuits of the CXL interface circuit 3300 and a connection structure of the CXL switch circuits may be variously changed and modified.

The first CXL switch circuit 3310 may be connected to the first host device 3110, the second host device 3120, the second CXL switch circuit 3320, and the third CXL switch circuit 3330. The second CXL switch circuit 3320 may be connected to the first CXL switch circuit 3310, the first CXL storage device 3210, and the second CXL storage device 3220. The third CXL switch circuit 3330 may be connected to the first CXL switch circuit 3310, the third CXL storage device 3230, and the fourth CXL storage device 3240.

As the first CXL switch circuit 3310 is connected to the first to fourth CXL storage devices 3210, 3220, 3230, and 3240 through the second CXL switch circuit 3320 and the third CXL switch circuit 3330, the CXL interface circuit 3300 may have flexibility and expandability for various storage devices.

In some embodiments, the first and second CXL storage devices 3210 and 3220 may directly communicate with each other through the second CXL switch circuit 3320. For example, through the second CXL switch circuit 3320, the first and second CXL storage devices 3210 and 3220 may transmit a request for redirection or may transmit a completion response indicating that a request is processed.

In some embodiments, the third and fourth CXL storage devices 3230 and 3240 may directly communicate with each other through one of the first and third CXL switch circuits 3310 and 3330. For example, through one of the first and third CXL switch circuits 3310 and 3330, the third and fourth CXL storage devices 3230 and 3240 may transmit a request for redirection or may transmit a completion response indicating that a request is processed. That is, a plurality of communication channels (e.g., channels used to transmit a request, a completion response, or data) may be present between different CXL devices.

As described above, according to embodiments of the present disclosure, a CXL interface circuit with the multi-switch structure may include a plurality of CXL switch circuits. One of a plurality of host devices and a plurality of storage devices connected to the CXL interface circuit may communicate with another one of the plurality of host devices and the plurality of storage devices through at least one of a plurality of CXL switch circuits present in the CXL interface circuit. Based on the above structure, the CXL interface circuit may efficiently allocate a communication channel to a CXL device (e.g., a host device or a CXL storage device) and may provide flexibility and expandability even when a CXL device is added or removed.

Figure 13:
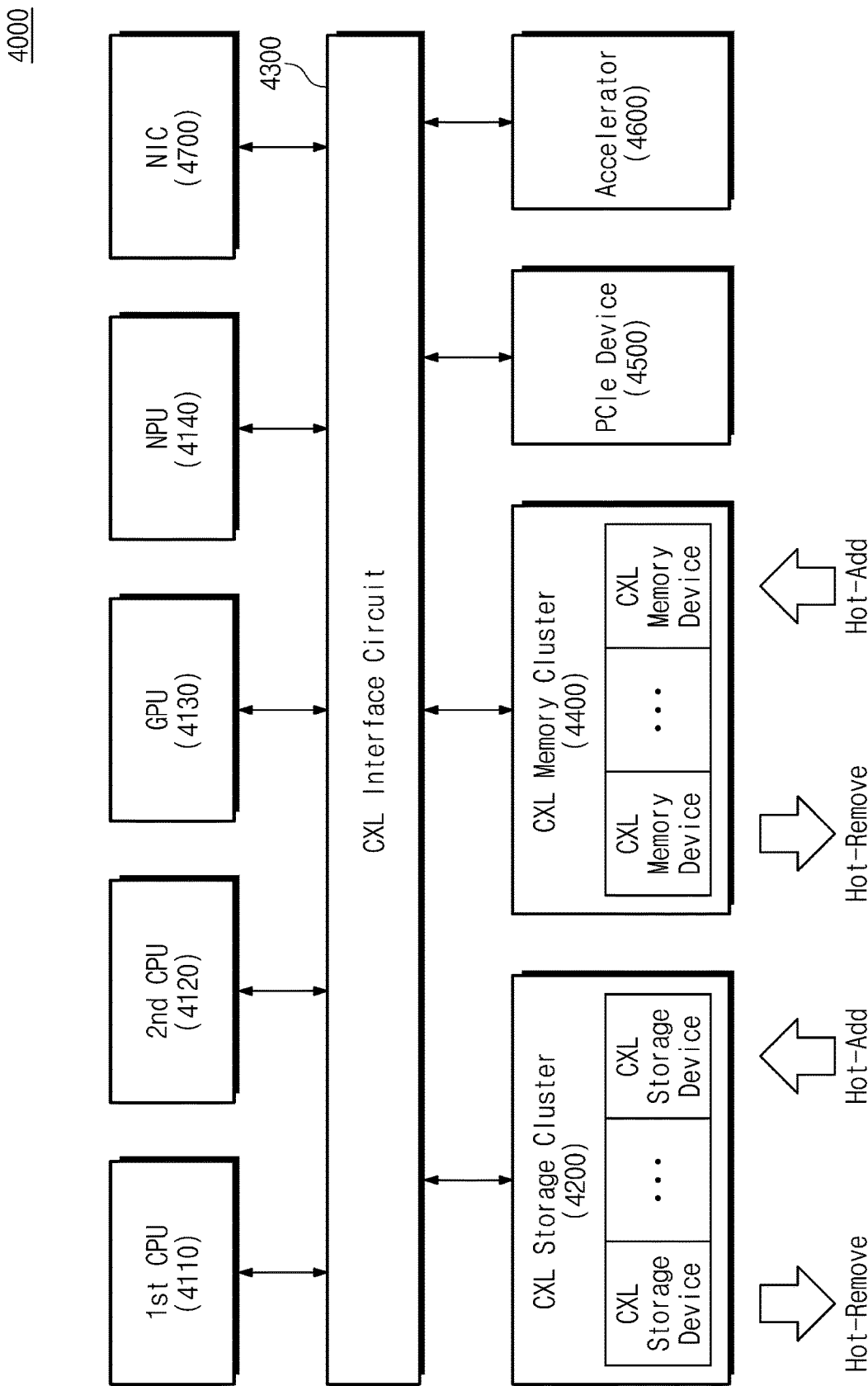
FIG. 13 is a block diagram of an electronic device, according to embodiments of the present disclosure.

FIG. 13 is a block diagram of an electronic device, according to embodiments of the present disclosure.

Referring to FIG. 13, an electronic device 4000 may include a first CPU 4110, a second CPU 4120, a GPU 4130, an NPU 4140, a CXL storage cluster 4200, a CXL interface circuit 4300, a CXL memory cluster 4400, a Peripheral Component Interconnect Express (PCIe) device 4500, an accelerator 4600, and a Network Interface Card (NIC) 4700.

The first CPU 4110, the second CPU 4120, the GPU 4130, and the NPU 4140 may correspond to the first to M-th host devices 3110 to 31M0 of FIG. 10. The CXL storage cluster 4200 may correspond to the first to N-th CXL storage devices 3210 to 32N0 of FIG. 10. The CXL interface circuit 4300 may correspond to the CXL interface circuit 3300 of FIG. 10.

The CXL memory cluster 4400 may operate as an external high-capacity volatile memory device for the CXL storage cluster 4200. The PCIe device 4500 may be a portable device with a PCIe-based form factor. The accelerator 4600 may be a hardware accelerator for assisting an operation of at least one of the first CPU 4110, the second CPU 4120, the GPU 4130, and the NPU 4140. The NIC 4700 may communicate with any other electronic device placed outside the electronic device 4000 over a network.

The CXL storage cluster 4200 may support a hot-plug function. For example, the CXL storage cluster 4200 may include a plurality of CXL storage devices. Some of the plurality of CLX storage devices may be disconnected in a hot-remove scheme while the electronic device 4000 is operating. Some of the plurality of CLX storage devices may be connected through a hot-add scheme while the electronic device 4000 is operating.

The CXL memory cluster 4400 may support the hot-plug function. For example, the CXL storage cluster 4200 may include a plurality of CXL memory devices. Some of the plurality of CXL memory devices may be disconnected in the hot-remove scheme while the electronic device 4000 is operating. Some of the plurality of CXL memory devices may be connected in the hot-add scheme while the electronic device 4000 is operating.

Figure 14:
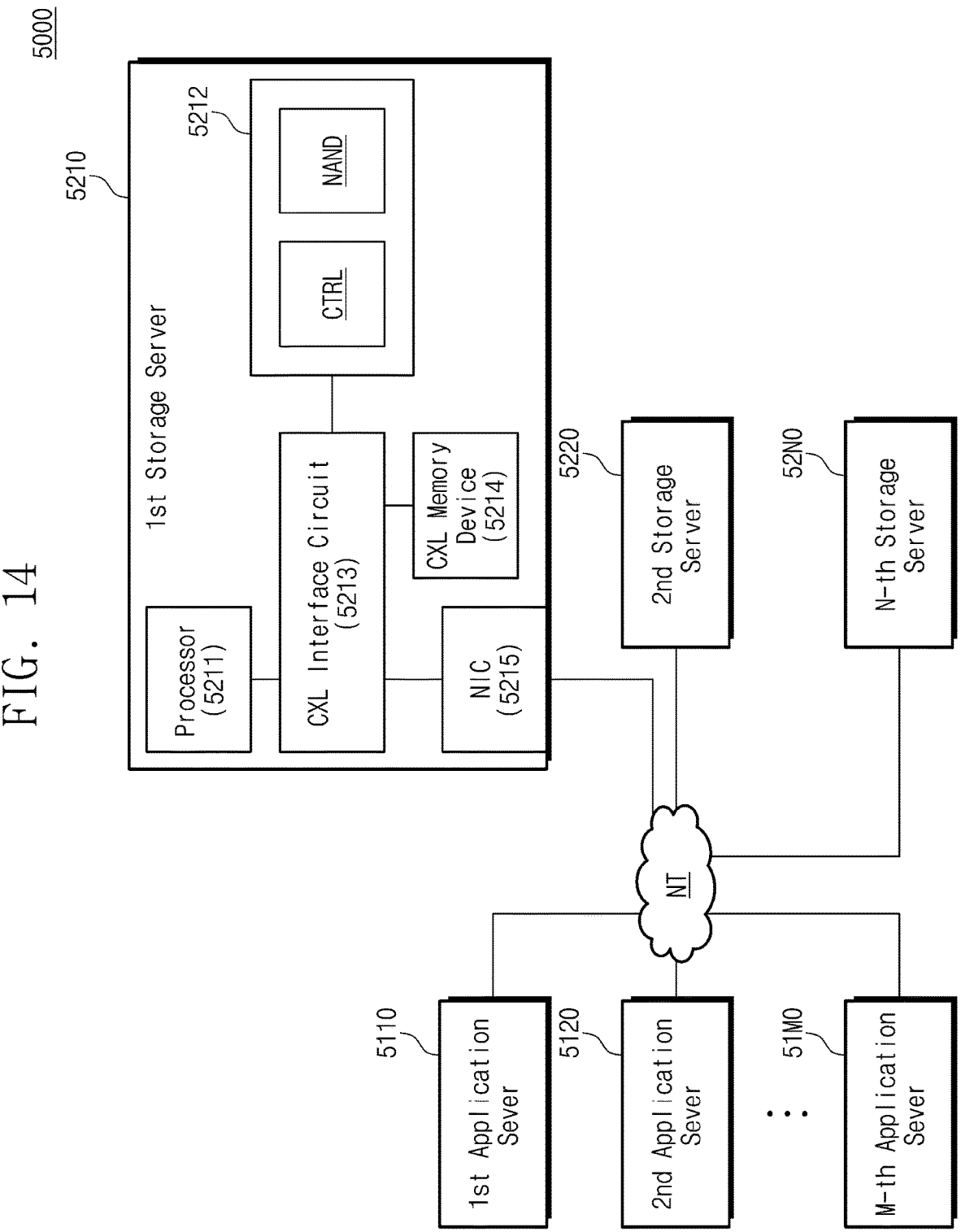
FIG. 14 is a block diagram of a data center, according to embodiments of the present disclosure.

FIG. 14 is a block diagram of a data center, according to embodiments of the present disclosure.

Referring to FIG. 14, a data center 5000 that is a facility collecting various data and providing services may be referred to as a "data storage center". The data center 5000 may be a system for operating a search engine and a database and may be a computing system used in a business such as, for example, a bank or in a government institution.

The data center 5000 may include a plurality of application servers 5110 to 51M0, a plurality of storage servers 5210 to 52N0, and a network NT. Any combination of the plurality of application servers 5110 to 51M0 and the plurality of storage servers 5210 to 52N0 may be connected over the network NT.

The first storage server 5210 may include a processor 5211, a CXL storage device 5212, a CXL interface circuit 5213, a CXL memory device 5214, and a NIC 5215. The CXL storage device 5212 may include a controller CTRL and a NAND flash NAND. The controller CTRL and the NAND flash NAND may respectively correspond to the first storage controller 1211 and the first non-volatile memory device 1212 of FIG. 1. In response to a request of the processor 5211, the CXL storage device 5212 may store data or may output the stored data. The NIC 5215 may communicate with at least one of the plurality of application servers 5110 to 51M0 and the second to N-th storage servers 5220 to 52N0 over the network NT.

For example, the network NT may be implemented by using, for example, a Fiber channel (FC) or an Ethernet connection. The network NT may be a storage-dedicated network such as, for example, a storage area network (SAN). Alternatively, the network NT may be implemented in compliance with a protocol such as, for example, FC over Ethernet (FCOE), Network Attached Storage (NAS), or NVMe over Fabrics (NVMe-oF).

In addition, each of the second to N-th storage servers 5220 to 52N0 may be implemented to be similar to the first storage server 5210.

At least one of the plurality of application servers 5110 to 51M0 may access a memory device or a storage device included in any other application server over the network NT or may access a memory device or a storage device included in the storage servers 5210 to 51M0 over the network NT. Accordingly, at least one of the plurality of application servers 5110 to 51M0 may perform various operations with respect to data stored in any other application servers and/or storage servers.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

As the size of data increases and increased expandability of a storage device is desired, a host device may use a plurality of storage devices. When an access is focused on a specific storage device, the lifetime of the specific storage device may be shortened, or a data input/output (I/O) speed may be delayed. When the host device directly manages the load balancing of the plurality of storage devices, the burden of management of the host device may increase. Embodiments of the present disclosure provide a technique for efficiently managing data between the plurality of storage devices while minimizing or reducing the burden of the host device.

According to embodiment of the present disclosure, an electronic device storing mapping information and a method of operating the same are provided.

Also, according to embodiments of the present disclosure, the workload may be distributed to a plurality of storage devices without the burden of management of a host device by redirecting a memory operation by using mapping information of a logical block address and a physical block address of any other storage device, and thus, the lifetime of the device may be improved.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of operating an electronic device which includes a first storage device, a second storage device, and a host device, the method comprising:
    providing, by the host device, a first request indicating a memory operation of target data to the first storage device;
    providing, by the first storage device, a second request indicating a redirection of the memory operation to the second storage device based on the first request;
    performing, by the second storage device, the memory operation based on the second request;
    providing, by the second storage device, the first storage device with a first completion response indicating that the memory operation is performed; and providing, by the first storage device, a second completion response to the host device based on the first completion response,
wherein, before the first request is received from the host device or after the first completion response is received from the second storage device, the first storage device stores first mapping information of a logical block address (LBA) of the target data and a physical block address (PBA) indicating a physical block of the second storage device, in which the target data are stored.

2. The method of claim 1, wherein the second storage device stores second mapping information of identification information of the first storage device and the PBA.

3. The method of claim 1, wherein the second storage device allocates the LBA based on the second request and an internal operating policy and stores second mapping information of the allocated LBA and the PBA.

4. The method of claim 1, wherein the electronic device further includes an interface circuit connected to the first storage device, the second storage device, and the host device,
wherein the first storage device provides the second request to the second storage device through the interface circuit in a peer-to-peer (P2P) scheme, and
wherein the second storage device provides the first completion response to the first storage device through the interface circuit in the P2P scheme.

5. The method of claim 1, wherein the memory operation is a write operation,
wherein each of the first request and the second request includes a host buffer address of a host buffer memory device which is included in the host device and stores the target data, and
wherein performing of the memory operation based on the second request by the second storage device includes:
establishing, by the second storage device, a data channel between a buffer memory device of the second storage device and the host buffer memory device of the host device based on the host buffer address of the second request;
receiving, by the second storage device, the target data from the host buffer memory device through the established data channel; and
storing, by the second storage device, the target data in the physical block.

6. The method of claim 5, wherein storing the target data in the physical block by the second storage device includes:
storing, by the second storage device, second mapping information of identification information of the first storage device and the PBA.

7. The method of claim 5, wherein the first request includes the LBA of the target data, and
wherein the first completion response includes the PBA indicating the physical block of the second storage device, in which the target data are stored, and
wherein the method further comprises:
storing, by the first storage device, the first mapping information of the LBA and the PBA of the second storage device based on the first request and the first completion response.

8. The method of claim 5, further comprising:
before the first request is provided, sharing, by the first and second storage devices, first status information of the first storage device and second status information of the second storage device,
wherein providing the second request indicating the redirection of the memory operation to the second storage device based on the first request by the first storage device includes:
selecting, by the first storage device, the second storage device among the first and second storage devices as a redirection storage device based on the first status information and the second status information, in response to the first request; and
providing, by the first storage device, the second request to the second storage device selected as the redirection storage device.

9. The method of claim 8, wherein each of the first status information and the second status information includes at least one of lifetime information, retention information, program/erase (P/E) cycle information, storage capacity information, and memory access count information of the corresponding storage device.

10. The method of claim 1, wherein the memory operation is a read operation,
wherein each of the first request and the second request includes a host buffer address of a host buffer memory device included in the host device,
wherein the first storage device stores the first mapping information before the first request is provided,
wherein the second storage device stores the target data in the physical block before the first request is provided,
wherein providing the second request indicating the redirection of the memory operation to the second storage device based on the first request by the first storage device includes:
providing, by the first storage device, the second request to the second storage device based on the first request and the first mapping information, and
wherein performing the memory operation based on the second request by the second storage device includes:
establishing, by the second storage device, a data channel between a buffer memory device of the second storage device and a host buffer memory device of the host device based on the host buffer address of the second request; and
providing, by the second storage device, the target data to the host buffer memory device through the established data channel.

11. The method of claim 1, wherein the memory operation is a delete operation,
wherein the first storage device stores the first mapping information before the first request is provided,
wherein the second storage device stores the target data in the physical block before the first request is provided,
wherein providing the second request indicating the redirection of the memory operation to the second storage device based on the first request by the first storage device includes:
providing, by the first storage device, the second request to the second storage device based on the first request and the first mapping information, and
wherein performing the memory operation based on the second request by the second storage device includes:
deleting, by the second storage device, the target data based on the second request.

12. The method of claim 1, wherein the electronic device further includes another host device,
wherein the second storage device allocates the LBA based on the second request and an internal operating policy and stores second mapping information of the allocated LBA and the PBA, and wherein the method further comprises:
providing, by the another host device, the second storage device with a third request indicating a second memory operation of second data whose LBA is identical to the LBA of the target data;
providing, by the second storage device, the first storage device with a fourth request indicating a redirection of the second memory operation based on the third request and the second mapping information; and
performing, by the first storage device, the second memory operation based on the fourth request.

13. The method of claim 1, wherein the electronic device further includes a Compute eXpress Link (CXL) interface circuit connected to the first storage device, the second storage device, and the host device.

14. The method of claim 13, wherein the host device provides the first request to the first storage device through the CXL interface circuit in compliance with a CXL.mem protocol,
wherein the first storage device provides the second request to the second storage device through the CXL interface circuit in compliance with the CXL.mem protocol, and
wherein the second storage device performs data communication corresponding to the memory operation with the host device through the CXL interface circuit in compliance with a CXL.io protocol.

15. The method of claim 13, wherein the CXL interface circuit includes a plurality of CXL switch circuits, and
wherein one of the first storage device, the second storage device, and the host device communicates with another of the first storage device, the second storage device, and the host device through at least one of the plurality of CXL switch circuits.

16. A method of operating an electronic device which includes a first storage device, a second storage device, and a host device, the method comprising:
sharing, by the first and second storage devices, first status information of the first storage device and second status information of the second storage device;
providing, by the host device, the first storage device with a first request indicating a write operation of target data, wherein the first request includes a logical block address (LBA) of the target data;
providing, by the first storage device, the second storage device with a second request indicating a redirection of the write operation based on the first request, the first status information, and the second status information;
performing, by the second storage device, the write operation based on the second request;
providing, by the second storage device, the first storage device with a first completion response indicating that the write operation is performed, wherein the first completion response includes a physical block address (PBA) indicating a physical block of the second storage device, in which the target data are stored;
storing, by the first storage device, mapping information of the LBA and the PBA of the second storage device based on the first request and the first completion response; and
providing, by the first storage device, a second completion response to the host device based on the first completion response.

17. The method of claim 16, further comprising:
after the second completion response is received, providing, by the host device, the first storage device with a third request indicating a read operation of the target data;
providing, by the first storage device, the second storage device with a fourth request indicating a redirection of the read operation based on the third request and the mapping information;
performing, by the second storage device, the read operation based on the fourth request;
providing, by the second storage device, the first storage device with a third completion response indicating that the read operation is performed; and
providing, by the first storage device, a fourth completion response to the host device based on the third completion response.

18. The method of claim 16, further comprising:
after the second completion response is received, providing, by the host device, the first storage device with a fifth request indicating a delete operation of the target data;
providing, by the first storage device, the second storage device with a sixth request indicating a redirection of the delete operation based on the fifth request and the mapping information;
performing, by the second storage device, the delete operation based on the sixth request;
providing, by the second storage device, the first storage device with a fifth completion response indicating that the delete operation is performed;
deleting, by the first storage device, the mapping information based on the fifth completion response; and
providing, by the first storage device, a sixth completion response to the host device based on the fifth completion response.

19. An electronic device, comprising:
a first storage device including a first command manager, a mapping table, and a first non-volatile memory device;
a second storage device including a second command manager and a second non-volatile memory device; and
a host device configured to generate a first request indicating a memory operation of target data,
wherein the first command manager is configured to provide the second storage device with a second request indicating a redirection of the memory operation based on the first request,
wherein the second command manager is configured to perform the memory operation based on the second request and to provide the first storage device with a first completion response indicating that the memory operation is performed,
wherein the first command manager is further configured to provide a second completion response to the host device based on the first completion response, and
wherein the mapping table is configured to store mapping information of a logical block address (LBA) of the target data and a physical block address (PBA) indicating a physical block of the second non-volatile memory device, in which the target data are stored.

20. The electronic device of claim 19, further comprising:
a Compute eXpress Link (CXL) interface circuit connected to the first storage device, the second storage device, and the host device,
wherein the CXL interface circuit includes a plurality of CXL switch circuits, and wherein one of the first storage device, the second storage device, and the host device communicates with another of the first storage device, the second storage device, and the host device through at least one of the plurality of CXL switch circuits.

* * * * *